United States Patent [19]

Ohta et al.

[11] Patent Number: 4,969,189

[45] Date of Patent: Nov. 6, 1990

[54] AUTHENTICATION SYSTEM AND APPARATUS THEREFOR

[75] Inventors: Kazuo Ohta, Fujisawa; Tatsuaki Okamoto, Yokosuka, both of Japan

[73] Assignee: Nippon Telegraph & Telephone Corporation, Tokyo, Japan

[21] Appl. No.: 367,650

[22] Filed: Jun. 19, 1989

[30] Foreign Application Priority Data

Jun. 25, 1988 [JP] Japan .................................. 63-156020
Apr. 5, 1989 [JP] Japan .................................. 64-87271
Apr. 5, 1989 [JP] Japan .................................. 64-87272

[51] Int. Cl.$^5$ ............................................. H04L 9/00
[52] U.S. Cl. ......................................... 380/25; 380/24; 380/30
[58] Field of Search ..................... 380/23-25, 380/30

[56] References Cited

U.S. PATENT DOCUMENTS

| | | | |
|---|---|---|---|
| 4,612,413 | 9/1986 | Robert et al. | 380/23 |
| 4,731,841 | 3/1988 | Rosen et al. | 380/23 |
| 4,759,063 | 7/1988 | Chaum | 380/30 |
| 4,759,064 | 7/1988 | Chaum | 380/30 |
| 4,799,061 | 1/1989 | Abraham et al. | 380/25 |
| 4,868,877 | 9/1989 | Fischer | 380/25 |
| 4,876,716 | 10/1989 | Okamoto | 380/30 |
| 4,888,801 | 12/1989 | Foster et al. | 380/25 |

*Primary Examiner*—Salvatore Cangialosi
*Attorney, Agent, or Firm*—Pollock, Vande Sande and Priddy

[57] ABSTRACT

In the case where a prover A proves the validity of a pretender B to a verifier C, B receives an initial response $x'$ created by A, randomizes it with a random component and sends it as $x''$, and randomizes an inquiry $\beta$ from C with the random component and sends it as $\beta'$ to A. A proves, for the received randomized inquiry $\beta'$, the validity of B by a secret key s randomized with a random number r and then sends it as a proved response z to B. B removes the random component from the proved response z and sends it as A's proof to C for verification. B keeps secret the procedures for randomizing the initial response $x'$ and the inquiry, thereby maintaining secret the correlation between A-B interactions $(x', \beta', z)$ nand B-C interactions $(x'', \beta, z')$.

In the case of proving the validity of a message m of a signature client B to the verifier C by attaching a signature of A to the message m, B receives an initial response $x'$ created by A and randomizes it with a random component to create a randomized response $x''$, creates a randomized inquiry $\beta'$ containing a random component by use of the randomized response $x''$ and the message m, and sends the randomized inqiury $\beta'$ to A. A proves, for the randomized inqiury $\beta'$, its validity by a secret key s randomized with a random number r and then sends it as a proved response z to B. B removes the random component from the proved response z to create a derandomized response $z'$, which is sent to C for verification.

31 Claims, 23 Drawing Sheets

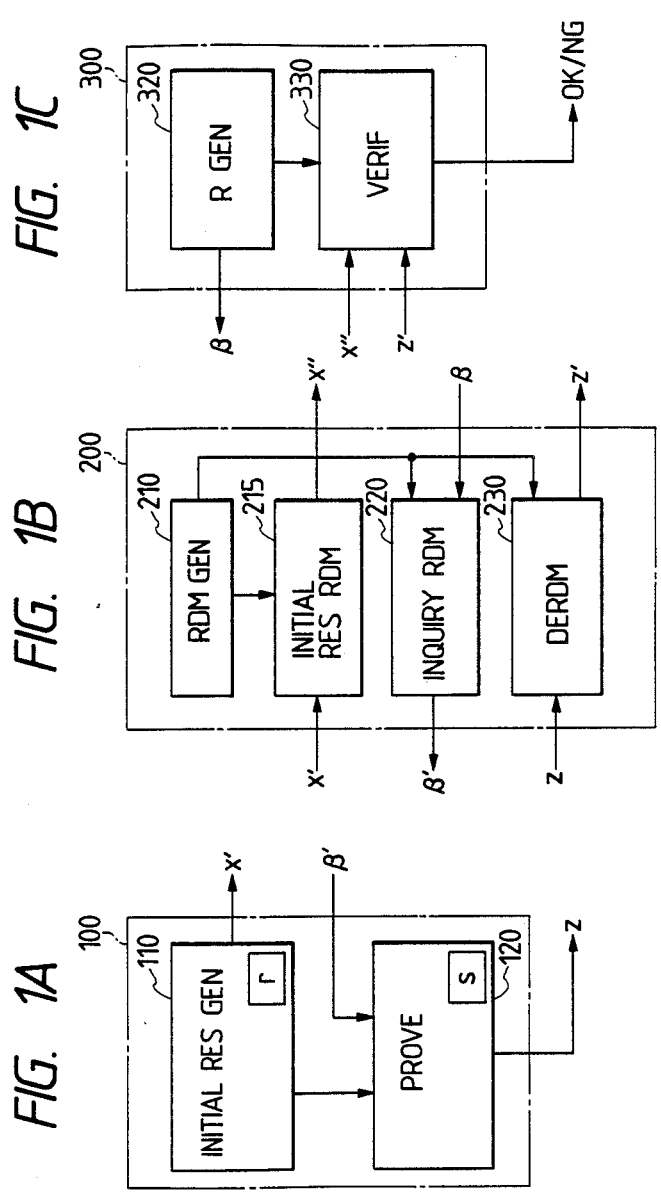

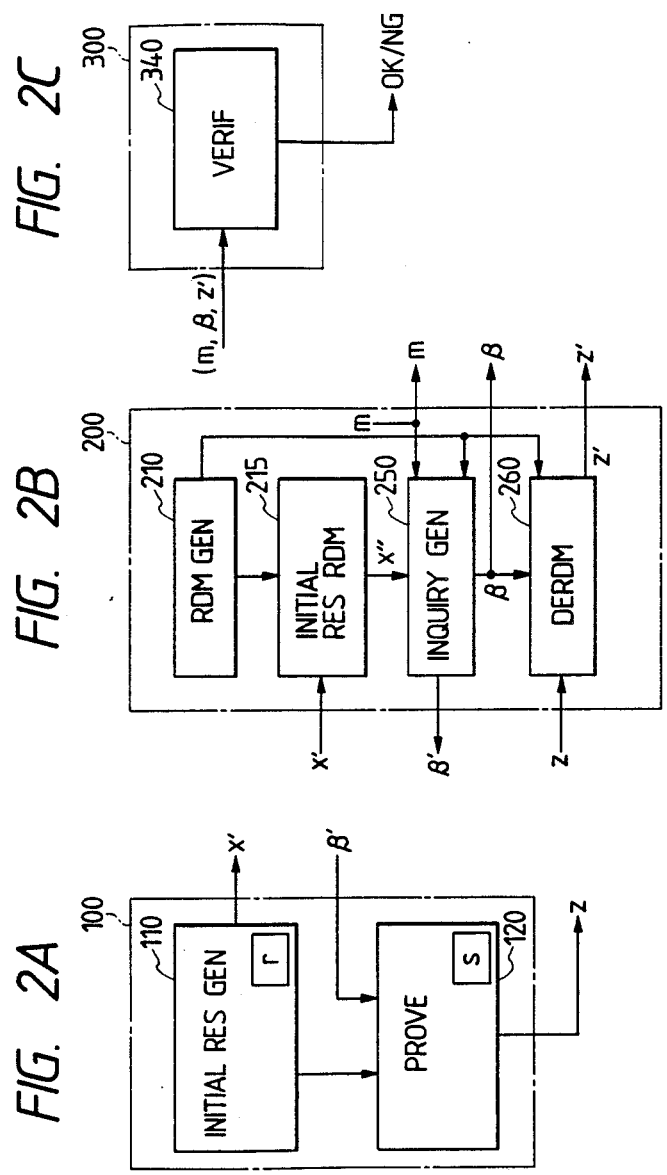

AUTHENTICATION SYSTEM AND APPARATUS THEREFOR

BACKGROUND OF THE INVENTION

The present invention relates to an authentication system and apparatus therefor which permit the implementation of a communication protocol for protecting the privacy of consumers in an electronic funds transfer or similar payment transactions through a telecommunication system.

In recent years there has been popularized settlement of accounts by an electronic funds transfer or IC card through utilization of a telecommunication system. Furthermore, much study is being given the use of a general-purpose prepaid card or electronic wallet as a substitute for cash. Once the circulation of funds through such a system is placed under the control of a particular organization, private information of consumers about their propensity to consume, etc. is accumulated or captured by the organization—and this poses serious problems from a personal privacy perspective.

One possible solution to this problem that has been proposed so far is a safe funds transfer system which makes the transfer of funds untraceable, as disclosed by David Chaum et al., for example, in U.S. Pat. No. 4,759,063 entitled "Blind Signature System" and in "Security without Identification: Transaction Systems to Make Big Brother Obsolete," Communications of ACM Vol. 28, No. 10, October 1985.

The blind signature system by Chaum et al. may be briefly summarized in the following outline.

A consumer (a signature client: B) creates a transformed message z by randomizing, with random numbers, an original message containing the contents of a transaction such as an amount of money (i.e. blinding the original message) and transmits the transformed message z to a bank (a prover: A). After checking the validity of the consumer B, the bank A withdraws the specified amount of money from the consumer's account, signs the transformed message z by use of a secret key d corresponding to the withdrawn amount of money and then returns the signed message z' to the consumer B. The consumer B removes the influence of the random numbers from the message z' (i.e. unblinds the message z') to obtain a variant m' of the original message m which retains the signature of the bank A, and the consumer B gives it to a shop (verifier: C) as payment. By confirming the signature of the bank A appended to the message m', the shop C judges that the message m' is worth a certain amount of money. Then the shop C receives the corresponding amount of money when supplying the message m' to the bank A. That is to say, the message m' possesses the function of a note.

Since the message z is created by applying random numbers to the original message m, the bank and a third party cannot link the transformed message z with the original m, and even if the bank and the shop should conspire, they could not associate the note m' with the transformed message z. In other words, it is impossible to know who issued the note m'. Thus, the method proposed by Chaum et al. does not allow the originator (the consumer) of the note m' to be traced back (that is, untraceable), and hence ensures the privacy of the consumer such as his propensity to consume.

With the above method, however, since the bank A needs only to sign the message z from the consumer B by direct use of the secret key d, it is infeasible to completely preclude the possibility of the consumer B decoding the signature of the bank A or leading the bank A to reveal the secret key d. If the consumer B should succeed in acquiring the secret key d, he could freely create and abuse the signature of the bank A. Accordingly, this blind signature system cannot be said to be absolutely secure in terms of safety.

SUMMARY OF THE INVENTION

It is therefore an object of the present invention to provide an authentication system and apparatus which permit the use of the blind signature scheme but ensure a higher degree of safety.

According to the authentication system of the present invention, in user authentication for a pretender B to have a prover A authenticate his identity to a verifier C, the prover A is provided with an initial response generator and a proving device, the pretender B is provided with a random generator, an initial response randomizer, an inquiry randomizer, and a derandomizer, and the verifier C is provided with a verifying device. The user authentication involves the following steps:

Step 1: The prover A transmits to the pretender B an initial response x' produced by the initial response generator using a random number r.

Step 2: The pretender B inputs the initial response x' received from the prover A and secret random components, produced by the random generator, into the initial response randomizer to create a randomized initial response x', which is transmitted to the verifier C.

Step 3: The verifier C transmits an inquiry $\beta$ to the pretender B.

Step 4: The pretender B inputs the inquiry $\beta$ received from the verifier C and the previously generated random components into the inquiry randomizer to produce a randomized inquiry $\beta'$, which is transmitted to the prover A.

Step 5: The prover A produces a proved response z corresponding to the randomized inquiry $\beta'$ by the proving device using a secret key s of his own and the random number r, and returns the proved response z to the pretender B.

Step 6: The pretender B inputs the proved response z and the previously generated random components into the derandomizer to eliminate the influence of the random components to thereby produce a derandomized proved response z', which is sent to the verifier C.

Step 7: The verifier C inputs the derandomized proved response z' into the verifying device to check whether the proved response z' is a correct response to the randomized initial response x" received from the pretender B previously and the inquiry $\beta$ sent thereto previously.

Steps 1 through 7 may be repeated a plurality of times.

In the above authentication system the correspondence between the information (x', $\beta'$, z) transmitted between the pretender B and the prover A and the information (x", $\beta$, z') transmitted between the verifier C and the pretender B is maintained in secrecy by keeping the random components secret on the part of the pretender B. Thus, in this user authentication the prover A can prove to the verifier C that he establishes the identity of the pretender B without disclosing the pretender's identity. In addition, since the prover A produces the proved response z by randomizing his secret key s with the random number r, the pretender B cannot steal the secret key s of the prover A. Thus this authentication system is excellent in safety.

In a message authentication system of the present invention in which the validity of a message of a signature client is proved by a prover A to a verifier C, the prover A is provided with an initial response generator and a providing device, the signature client B is provided with a random generator, an initial response randomizer, an inquiry generator, and a derandomizer, and the verifier C is provided with a verifying device. The authentication involves the following steps:

Step 1: The prover A transmits to the signature client B an initial response x' produced by the initial response generator using a random number r.

Step 2: The signature client B inputs the initial response x' received from the prover A and secret random components, produced by the random generator, into the initial response randomizer to create a randomized initial response x", and inputs the randomized initial response x" and a message m to be signed into the inquiry generator to obtain an inquiry $\beta$ and a randomized inquiry $\beta'$ produced by randomizing the inquiry $\beta$ with the random components. The signature client B sends the randomized inquiry $\beta'$ to the prover A.

Step 3: The prover A produces a proved response z corresponding to the randomized inquiry $\beta'$ by the proving device using a secret key s of his own and the random number r, and transmits the proved response z to the signature client B.

Step 4: The signature client B inputs the proved response z and the previously generated random components into the derandomizer to eliminate the influence of the random components, thereby creating a derandomized proved response z' corresponding to the message m. The signature client B transmits the proved response z' to the verifier C, together with the message m and the inquiry $\beta$.

Step 5: The verifier C inputs the derandomized proved response z', the message m and the inquiry $\beta$ into the verifying device, thereby checking whether the inquiry $\beta$ and the proved response z' constitute a correct signature for the message m.

In the above authentication system the correspondence between the information (x', $\beta'$, z) transmitted between the signature client B and the prover A and the information (m, $\beta$, z') transmitted between the verifier C and the signature client B is maintained in secrecy by keeping the random components secret on the part of the signature client B. As is the case with the aforementioned user authentication system, since the prover A produces the proved response z by randomizing its secret key s with the random number r, the signature client B cannot steal the secret key s. Accordingly, this authentication system is also excellent in safety.

BRIEF DESCRIPTION OF THE DRAWINGS

FIGS. 1A through 1C are block diagrams illustration the basic constitutions of a prover A, a pretender B and a verifier C for the user authentication system in FIG. 1;

FIGS. 2A through 2C are block diagrams illustrating the basic constitutions of a prover A, a signature client B and a verifier C for the message authentication system in FIG. 2;

DESCRIPTION OF THE PREFERRED EMBODIMENTS

Figure 1:
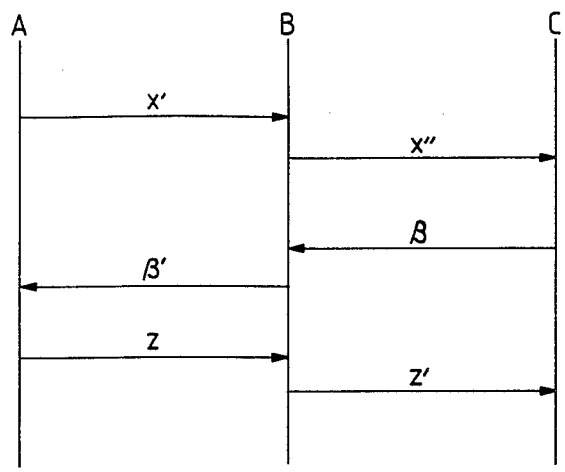
FIG. 1 is a diagram showing the basic procedure of the user authentication system of the present invention

FIG. 1 shows the basic procedure for performing the user authentication in accordance with the authentication system of the present invention. The prover A, the pretender B, and the verifier C transmit and receive information between them via telecommunication lines. The prover A, identified by 100 in FIG. 1A, includes an initial response generator 110 and a proving device 120. The pretender B, identified by 200 in FIG. 1B, includes a random generator 210, an initial response randomizer 215, an inquiry randomizer 220, and a derandomizer 230. The verifier C, identified by 300 in FIG. 1C, includes an inquiry generator 320, and a verifying device 330.

The user authentication takes place following such steps as mentioned below in conjunction with FIG. 1.

Step 1: The prover A transmits to the pretender B an initial response $x'$ produced by the initial response generator using a random number r.

Step 2: The pretender B inputs the initial response $x'$ received from the prover A and random components, produced by the random generator 210, into the initial response randomizer 215 to create a randomized initial response $x''$, which is transmitted to the verifier C.

Step 3: The verifier C creates an inquiry $\beta$ by the inquiry generator 320 and transmits the inquiry $\beta$ to the pretender B.

Step 4: The pretender B inputs the inquiry $\beta$ received from the verifier C and the above-mentioned random components into the inquiry randomizer 22 to create a randomized inquiry $\beta'$, which is transmitted to the prover A.

Step 5: The prover A creates a proved response z corresponding to the randomized inquiry $\beta'$ by the proving device 120 using a secret key s of its own and the random number r, and returns the proved response z to the pretender B.

Step 6: The pretender B inputs the proved response z and the afore-mentioned random components into the derandomizer 230, by which the influence of the random components applied by the pretender B to the inquiry $\beta$ in Step 4 is eliminated to obtain a proved response $z'$, which is transmitted to the verifier C.

Step 7: The verifier C inputs the proved response $z'$ into the verifying device 330, thereby checking whether the proved response $z'$ is a correct response to both of the randomized initial response $x''$ previously received and the inquiry $\beta$ previously transmitted.

In the above authentication system, since the correspondence between the information ($x'$, $\beta'$, z) transmitted between the pretender B and the prover a and the information ($x''$, $\beta$, $z'$) transmitted between the verifier C and the pretender b is maintained in secrecy by keeping the random components secret on the part of the pretender B, it is possible for the prover A to assure the verifier C of the identity of the pretender B without disclosing it. In addition, it has been proved by the inventors of this application that the pretender B cannot steal the secret key s from the prover A because the prover A creates the proved response z by randomizing the secret key s with the random number r ("An Abuse of Zero Knowledge Proofs, Measures to Protect It, and Its Applications," T. Okamoto and K. Ohta, The Proceedings of The 1988 Workshop on Cryptography and Information Security, Kobe, Japan, July 28-29, 1988 and "Divertible Zero Knowledge Interactive Proofs and Commutative Random Self-Reducibility," T. Okamoto and K. Ohta, Proceedings of Eurocrypt '89, Apr. 10-13, 1989). Accordingly, the authentication system of the present invention excels, in terms of safety, the blind signature system proposed by Chaum et al.

Figure 2:
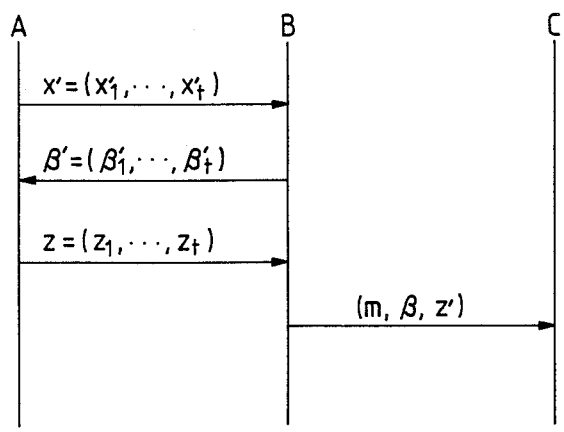
FIG. 2 is a diagram showing the basic procedure of the message authentication system of the present invention

FIG. 2 shows the basic procedure for the message authentication in accordance with the authentication system of the present invention. The prover A, the signature client B, and the verifier c transmit and receive information between them via telecommunication lines. The prover A, identified by 100 in FIG. 2A, includes an initial response generator 110 and a proving device 120. This constitution is exactly the same as that for the user authentification shown in FIG. 1. The signature client B, identified by 200 in FIG. 2B, includes a random generator 210, an initial response randomizer 215, an inquiry randomizer 250, and a derandomizer 260. The verifier C, identified by 300 in FIG. 2C, includes a verifying device 340.

The message authentication involves the following steps.

Step 1: The prover A transmits to the signature client B an initial response $x'$ produced by the initial response generator 110 using random numbers r.

Step 2: The signature client B inputs the initial response $x'$ received from the prover A and secret random components produced by the random generator 210 into the initial response randomizer 215 to create a randomized initial response $x''$. The randomized initial response $x''$ and a message m to be signed are input into the inquiry generator 250 to produce an inquiry $\beta$ and a randomized inquiry $\beta'$ created by randomizing the inquiry $\beta$ with random numbers. The randomized inquiry $\beta'$ is sent to the prover A.

Step 3: The prover A produces, by proving device 120, a proved response z corresponding to the received randomized inquiry $\beta'$, using a secret key s of the prover A and the random numbers r. The proved response z is sent to the signature client B.

Step 4: The signature client B inputs the proved response z and the above-mentioned random components into the derandomizer 260 to eliminate the influence of the random components applied by the signature client B to the initial response x' in Step 2, thereby producing a proved response z' corresponding to the message m. The message m is sent to the verifier C, along with the inquiry $\beta$.

Step 5: The verifier C input the proved response z', the message m, the inquiry $\beta$ into the verifying device 340, checking whether the inquiry $\beta$ and the proved response z' constitute a correct signature corresponding to the message m.

In this authentication system the correspondence between the information (x', $\beta'$, z) transmitted between the signature client B and the prover A and the information (m, $\beta$, z') transmitted between the verifier C and the signature client B can be maintained in secrecy by keeping the random components secret on the part of the signature client B. In addition, as is the case with the afore-mentioned user authentication system, the prover A creates the proved response z by randomizing with its secret key s, so that the signature client B cannot steal the secret key s of the prover A. Accordingly, this system is highly safe.

The blind signature system by chaum is not absolutely safe as referred to previously. Moreover, the chaum system is based on the RSA cryptography of a large amount of computation, and hence poses a problem in that a large processing capability is needed to obtain a signed response z' from a response z by use of a secret key d (In the afore-mentioned example of the blind signature system a large amount computation is imposed on the bank A). In concrete terms, the RSA cryptographic scheme cells for an average of 768 multiplications (including modulo N calculations) of integers of 200 digits.

By the way, a high-speed authentication system has been proposed by Fiat and Shamir (U.S. Pat. No. 4,748,688 issued to Shamir and Fiat, and A. Fiat and A. Shamir, "How to prove yourself: practical solutions to identification and signature problems," Proceedings of Crypto 86, pp. 18-1-18-17 Santa Barbara, August 1986).

With the Fiat-Shamir method, the amount of computation is t(k+2)/2 multiplications (including modulo N calculations) on the average (the meanings of k and t described later), and in particular, it is recommended to select k=5 and t=4. In such a case, the number of multiplications needed in the Fiat-Shamir method is 14. Thus, this method affords substantial reduction of the computation as compared with the signature method based on the RSA scheme. In concrete terms, since 14/768=0.02, the authentication can be achieved with computation 2% of that required by the RSA scheme.

The outline of the Fiat-Shamir method is as follows.

At first, a trusted center creates, by the following procedure, k secret keys $s_j$ (where $1 \leq j \leq k$, k being a parameter which determines the degree of a security and greater than 1) for a user who uses an ID as a proof of his identity. Here, N is information made public and can be expressed as $N = P \times Q$, where P and Q are secret primes. Further f is a one-way function and is made public.

Step 1: $x_j = f(ID, j) (1 \leq j \leq k)$ is calculated using the one-way function f.

Step 2: $s_j = \sqrt{x_j} \pmod{N}$ is calculated using the primes factors P and Q of N for each $x_j$. That is, $s_j^2 = s_j \pmod{N}$.

(Note) In the Fiat-Shamir method, $s_j = \sqrt{1/x_j} \pmod{N}$ is employed, though the same result can be obtained even by defining $s_j$ as mentioned previously.

Step 3: The center secretly issues k secret keys $s_j$ to the user and makes public the function f and the composite number N.

The computation of the square root in (mod N) can be conducted only when the prime factors (P and Q) of N are known. The method therefor is disclosed in Rabin, M. O., "Digitalized Signatures and Public-Key Functions as Intractable as Factorization," Tech. Rep. MIT/LCS/TR-212, MIT, Lab. Comput. Sci., 1979, for example.

The user authentication system is as follows.

A prover A proves, in the following procedure, to a verifier C that he is A.

Step 1: A sends ID to C.

Step 2: C computes information $x_j = f(ID, j) (1 \leq j \leq k)$.

Next, the following steps 3-6 are repeated for i=1, ..., t (t being a parameter which determines the security of the system and has a-value greater than 1).

Step 3: A creates a random number $r_i$, computes $x'_i = r_1^2 \pmod{N}$ and sends it to C.

Step 4: C creates a of bits ($e_{i1}, \ldots, e_{jk}$) each of 0 or 1 and sends it to A.

Step 5: A creates a signed message $z_i$ b computing $$z_i = r_i \prod_{e_{ij} = 1} s_j \pmod{N}$$

and sends the signed message $z_i$ to C.

Step 6: C checks that $$x'_1 = z_i^2 / \prod_{e_{i,j} = 1} x_j \pmod{N}$$

According to the method of creating $z_i$, $$z_i^2 / \prod_{e_{i,j} = 1} x_j = r_i^2 \prod_{e_{i,j} = 1} (s_j^2 x_j^{-1}) = r_i^2 = x'_i \pmod{N}$$

so that the verifier C accepts A's proof of identity only when all the t checks are successful.

The probability of the verifier C mistaking a bongus prover for A is $\frac{1}{2}^{kt}$, where k is the number of secret keys $s_j$ administered by the prover and t defines the number of communications of the message.

The above is the user authentication system by the Fiat-Shamir method and the message authentication system can be implemented by modifying the above-mentioned procedure as follows.

First $k \times t$ bits of $f(m, x'_1, \ldots, x'_t)$ obtained by applying the one-way function f to a message m and $(x'_1, \ldots, x'_t)$ are regarded as the bit string $(e_{ij})$ in the above procedure and $(ID, m, (e_{ij}), z_1, \ldots, z_t)$ is sent as a signed message to the verifier.

As mentioned above, the Fiat-Shamir method is a high-speed authentication system, but up to now, there has not been proposed an untraceable authentication system employing the Fiat-Shamir method.

Figure 3:
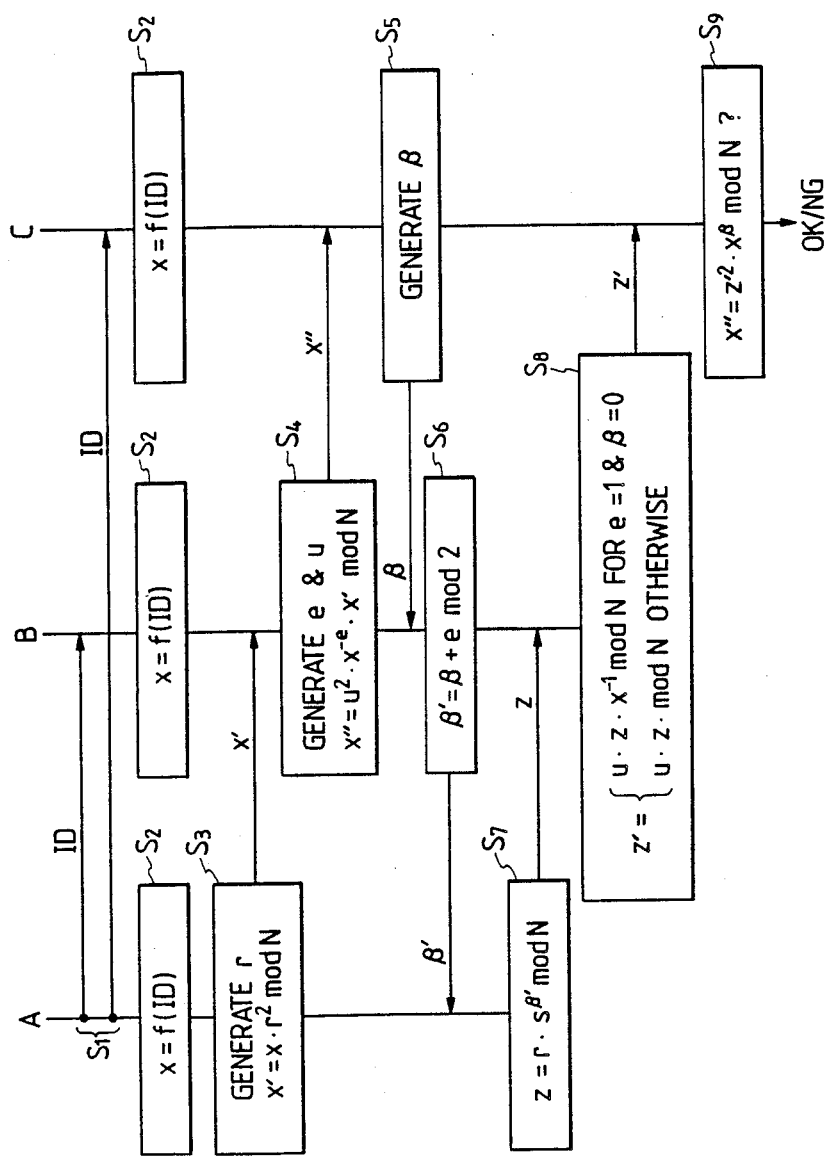
FIG. 3 is a diagram showing a concrete procedure of the user authentication system according to a first embodiment of the present invention.
Figure 4:
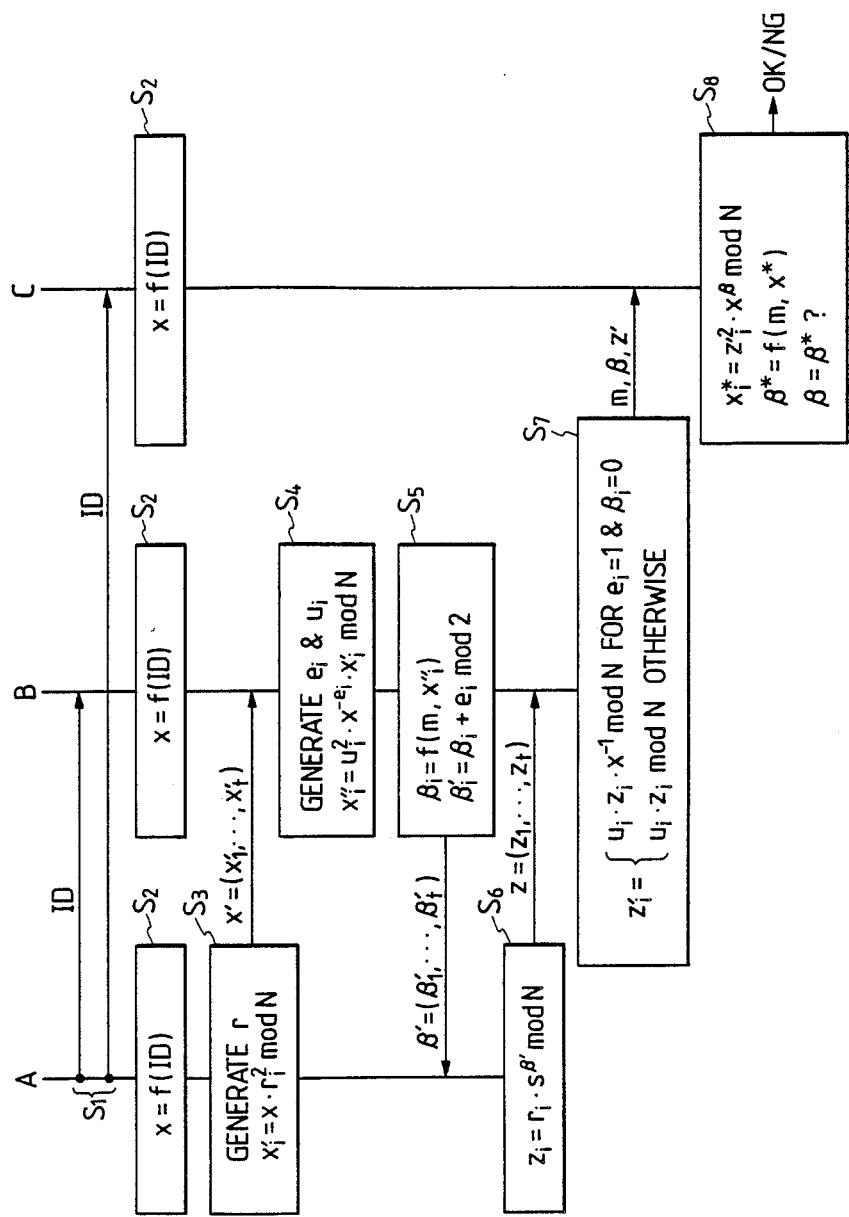
FIG. 4 is a diagram showing a concrete procedure of the message authentication system according to the first embodiment of the present invention.

FIGS. 3 and 4 respectively show procedures for user authentication and message authentication in the case of applying the above Fiat-Shamir method to the authentication systems of the present invention depicted in FIGS. 1 and 2. FIGS. 5 to 9 illustrate the constitutions of the prover A, the pretender or the signature client B, and the verifier C for performing the authentications.

The user authentication in FIG. 3 employs the user authentication system of the Fiat-Shamir method between the prover A and the pretender B and between the pretender B and the verifier C, and implements an untraceable user authentication system by keeping secret, on the part of the pretender B, information which associates the two Fiat-Shamir methods with each other.

Figure 5:
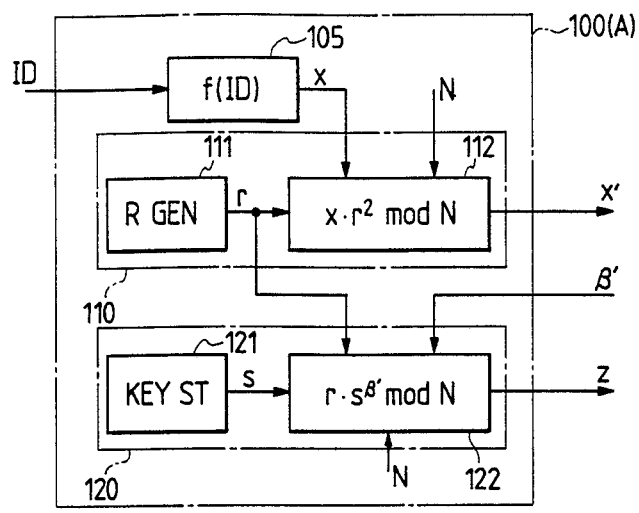
FIG. 5 is a block diagram illustrating the construction of the prover A for both the user authentication and the message authentication in the first embodiment of the invention.
Figure 6:
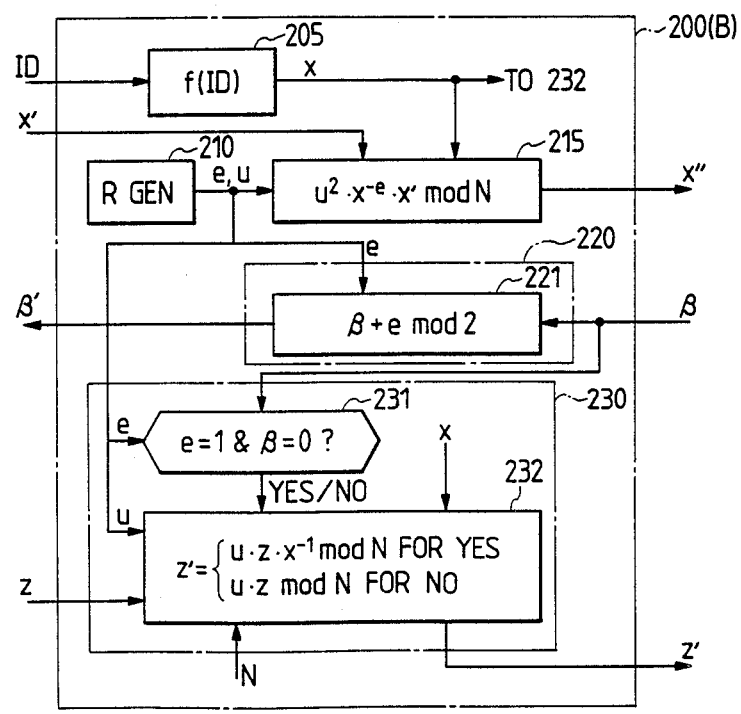
FIG. 6 is a block diagram illustrating the construction of the pretender B for the user authentication in the first embodiment of the invention.
Figure 7:
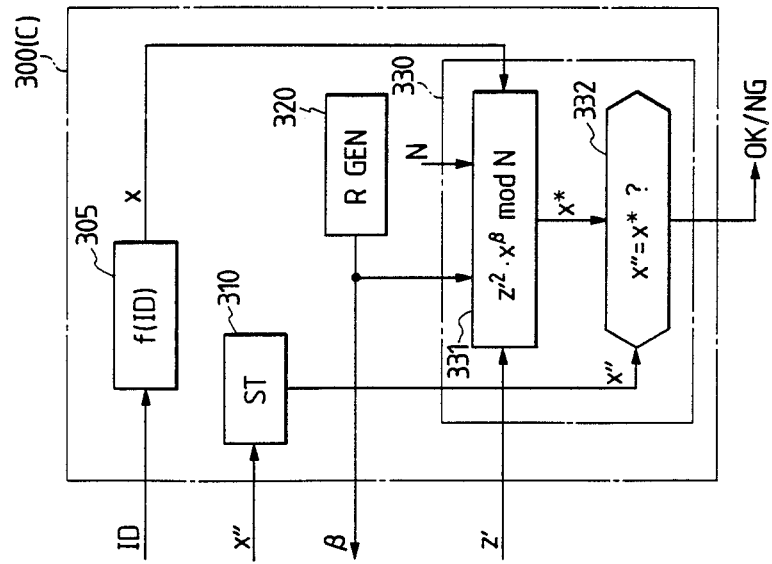
FIG. 7 is a block diagram illustrating the construction of the verifier C for the user authentication in the first embodiment of the invention.

As in the case of the Fiat-Shamir method, a trusted center makes public a composite number N and a one-way function f, computes a secret key s which corresponds to identifying information ID of the prover A and satisfies $s^2 \pmod N = x = f(ID)$, and sends the secret key s to the prover A. Referring now to FIGS. 5 to 7 which illustrate the constitutions 100, 200 and 300 of the prover A, the pretender B and the verifier C, respectively, the user authentication procedure will be described in connection with the case where $k=1$.

The prover A takes the following procedure to prove the validity of the pretender B to the verifier C.

Step $S_1$: The prover A sends identifying information ID to the pretender B and the verifier C.

Step $S_2$: The prover A, the pretender B and the verifier C compute information $x = f(ID)$ using one-way functions 105, 205 and 305, respectively. Next, the following steps $S_3$ to $S_6$ are repeated t times.

Step $S_3$: The prover A generates an initial response $x'$ by an initial response generator 110 and sends it to the pretender B.

The initial response generator 110 can be formed by a random generator 111 and a modulo calculator 112. A random number r is generated by the random generator 111 and $x'$ is computed by the modulo calculator using
$x' = x \cdot r^2 \pmod N$ Step $S_4$: Upon receipt of the initial response $x'$, the pretender B generates a random bit e, which is 0 or 1, and a random number u, both generated by a random generator 210, inputs them into an initial response randomizer 215, together with the initial response $x'$ and x created by a function generator 205 in advance, thereby computes a randomized initial response $x''$, and sends it to the verifier C.

The Initial response randomizer 215 is formed as a modulo calculator, for example, and computes the randomized initial response $x''$ by $x'' = u^2 \cdot x^{-e} \cdot x' \pmod N$ based on the received initial response $x'$, x generated by the function calculator 205, and random components e and u generated by the random generator 210.

Step $S_5$: The verifier C stores the randomized initial response $x''$ in an information storage 310, creates a random bit $\beta$ which is 0 or 1 by a random generator 320, and then sends it as an inquiry to the pretender B.

Step $S_6$: The pretender B inputs the inquiry $\beta$ and the random bit e, created previously, into an inquiry randomizer 220 to compute a randomized inquiry $\beta'$, which is sent to the prover A.

The inquiry randomizer 220 is formed by a modulo calculator, for example, which computes the randomized inquiry $\beta'$ by $$\beta' = \beta + e \pmod 2.$$

The above modulo calculation is equivalent to the exclusive OR of $\beta$ and e.

Step $S_7$: Upon receipt of the randomized inquiry $\beta'$, the prover A inputs the random number r, previously created by the random generator 111, and the randomized inquiry $\beta'$ into the proving device 120 to compute a proved response z, which is sent to the pretender B.

The proving device 120 is formed by, for example, a secret key storage 121 and a modulo calculator 122. The secret key s, which is read out of the secret key storage 121, the random number r created by the random generator 111, and the received randomized inquiry $\beta'$, are provided to a modulo calculator 122, wherein the proved response z is computed by $$z = r \cdot s^{\beta'} \pmod N.$$

Step $S_8$: Upon receipt of the proved response z, the pretender B applies the proved response z, the previously created information x, the inquiry $\beta$ and the random components e and u to the derandomizer 230 to compute a proved response $z'$ having removed therefrom the random components. The proved response $z'$ is sent to the verifier C.

The derandomizer 230 comprises, for instance, a condition checker 231 and a modulo calculator 232, and computes the proved response $z'$ by $$z' = \begin{cases} u \cdot z \cdot x^{-1} \pmod N & \text{for } e = 1 \text{ and } \beta = 0 \\ u \cdot z \pmod N & \text{otherwise} \end{cases}$$

Step $S_9$: Upon receipt of the proved response $z'$, the verifier C verifies its validity by use of the verifying device 330.

The verifying device 330 comprises, for example, a modulo calculator 331 and a comparator 332, and checks whether or not $$x'' = z'^2 \cdot x^\beta \pmod N$$

holds for $x''$ read out of the information storage 310, x produced by the function calculator 305 and $\beta$ generated by the random generator 320.

In the above the inquiry-response interactions are performed sequentially t times, but they may also be performed at the same time.

Figure 9:
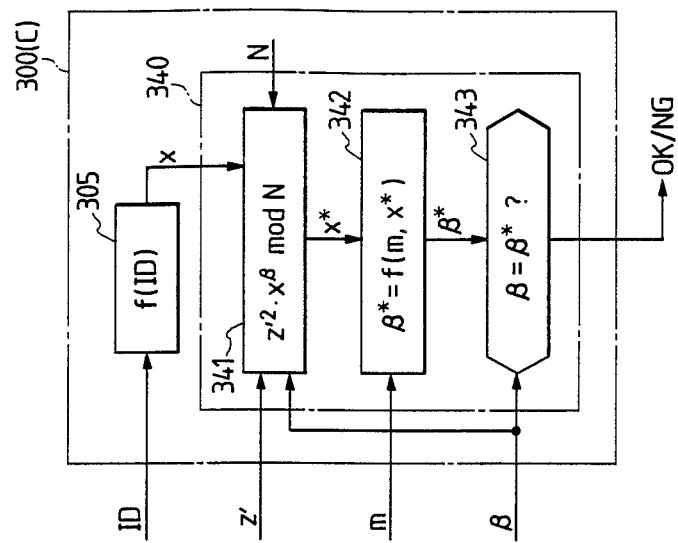
FIG. 9 is a block diagram illustrating the construction of the verifier C for the message authentication in the first embodiment of the invention.
Figure 8:
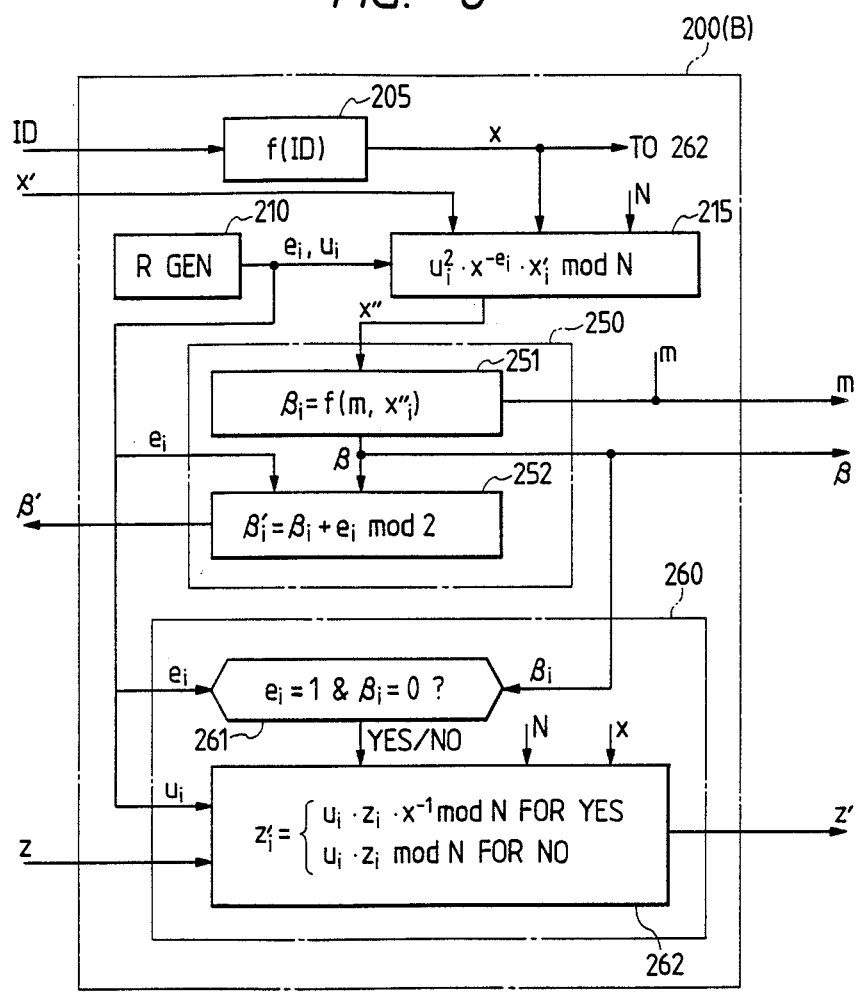
FIG. 8 is a block diagram illustrating the construction of the signature client B for the message authentication in the first embodiment of the invention.

Next, the message authentication procedure shown in FIG. 4 will be described with reference to the constitutions 100, 200 and 300 of the prover A, the signature client B and the verifier C depicted in FIGS. 5, 8 and 9, respectively.

This procedure employs the use authentication system of the Fiat-Shamir method between the prover A and the signature client B and the message authentication system of the Fiat-Shamir method between the signature client B and the verifier C. An untraceable message authentication can be implemented by keeping secret, on the part of the signature client B, information which links the two authentication systems.

As is the case with the Fiat-Shamir method, a trusted center makes public the composite number n and the one-way function f, computes the secret key s corresponding to the identifying information ID of the prover A, and sends the secret key s to the prover A. The following description will be given of the case where $k=1$.

The signature client B signs a message m through the aid of the prover A using the following procedure.

Step S₁: The prover A sends the identifying information ID to the signature client B and the verifier C.

Step S₂: The prover A, the signature client B and the verifier C compute $x=f(ID)$ by use of the one-way function calculators 105, 205 and 305, respectively.

Step S₃: The prover A computes an initial response $x'$ composed of t responses $x'_i$ (i=1, 2, ..., t) by the initial response generator 110 and sends it to the signature client B.

The initial response generator 110 comprises, for example, a random generator 111 and a modulo calculator 112. The random generator 111 is used to generate t random numbers $r_i$ and the modulo calculator 112 is used to compute the t responses $x'_i$ by $$x'_i = x \cdot r_i^2 \pmod{N}.$$

The responses $x'_i$ thus obtained are sent as the initial response $x'$ to the signature client B.

Step S₄: Upon receipt of the initial response $x'$, the signature client B generates t sets of a random bit $e_i$, which is 0 or 1, and a random number $u_i$ by use of the random generator 210, and inputs their values, the received t responses $x'_i$ and the previously created x into the initial response randomizer 215 to obtain t randomized initial responses $x''_i$, and $x''=(x''_1, ... x''_t)$ is supplied to an inquiry generator 250.

The initial response randomizer 215 is formed by a modulo calculator, for example. The t sets of $e_i$ and $u_i$ created by the random generator 210, the received t initial responses $x'_i$ and the above-mentioned x are applied to the initial response randomizer 215, wherein the t randomized initial responses $x''_i$ are formed by $$x''_i = u_i^2 \cdot x^{-e_i} \cdot x'_i \pmod{N} \quad (i=1, 2, ..., t).$$

Step S₅: The signature client B inputs the message m and the t randomized initial responses $x''_i$ i into an inquiry generator 250 to thereby create an inquiry $\beta$ and a randomized inquiry $\beta'$ obtained by randomizing the former with the random component $e_i$. The randomized inquiry $\beta'$ is transmitted to the prover A and the inquiry $\beta$ is applied to a derandomizer 260.

The inquiry generator 250 comprises, for example, a one-way function calculator 251 and a modulo calculator 252, by which the inquiry $\beta=(\beta_1, ..., \beta_t)$ and the randomized inquiry $\beta'=(\beta'_1, ..., \beta'_t)$ are composed by $\beta=(\beta_1,...,\beta_t)=f(m, x''_1,...x''_t)$ and $\beta'_i = \beta_i + e_i \pmod 2$ (i=1,2,...,t).

Step S₆: Upon receipt of the randomized inquiry $\beta'$, the prover A computes a proved response z, by the proving device 120, from the previously generated random numbers $r_i$ and the received randomized inquiry $\beta'$, and sends the proved response z to the signature client B.

The proving device 120 comprises, for example, a secret key storage 121 and a modulo calculator 123. A secret key s read out of the secret key storage 121, the random number supplied from the random generator 111, and the randomized inquiry $\beta'$ are applied to the modulo calculator 122, wherein the proved response $$z=(z_1, ..., z_t)$$

is obtained using a proved response $z_i$ calculated by $$z_i = r_i \cdot s^{\beta'_i} \pmod{N} \quad (i=1, 2, ..., t).$$

Step S₇: Upon receipt of the proved response z, the signature client B provides the proved response z, the previously created information x and the t sets of random numbers $e_i$ and $u_i$ to a derandomizer 260, wherein a proved response z' having removed therefrom the influence of random components is computed. The proved response z' thus obtained is sent to the verifier C, together with the inquiry $\beta$ and the message m.

The derandomizer 260 comprises, for example, a condition checker 261 and a modulo calculator 262, by which $$z'=(z'_1, ..., z'_t)$$

is obtained using $z'_i$ computed by $$z'_i = \begin{cases} u_i \cdot z_i \cdot x^{-1} \pmod{N} & \text{for } e_i = 1 \text{ and } \beta_i = 0 \\ u_i \cdot z_i \pmod{N} & \text{otherwise} \end{cases}$$

$$(i = 1, 2, ..., t)$$

Step S₈: The verifier C checks the validity of (m, $\beta$, z') by use of a verifying device 340.

The verifying device 340 comprises, for example, a modulo calculator 341, a one-way function calculator 342, and a comparator 343, by which $x^*_i$ is obtained by $$x^*_i = z'_i{}^2 \cdot x^\beta \pmod{N}$$

and it is checked whether or not $$\beta = f(m, x^*_1, ... x^*_t)$$

holds.

In the authentication systems shown in FIGS. 3 and 4, k=1, and consequently, the prover A uses only one secret key s. In order to ensure the security of the user authentication, in particular, it is necessary to increase the number of interations t of Steps 3 to 6, so that the communication efficiency is poor.

Figure 10:
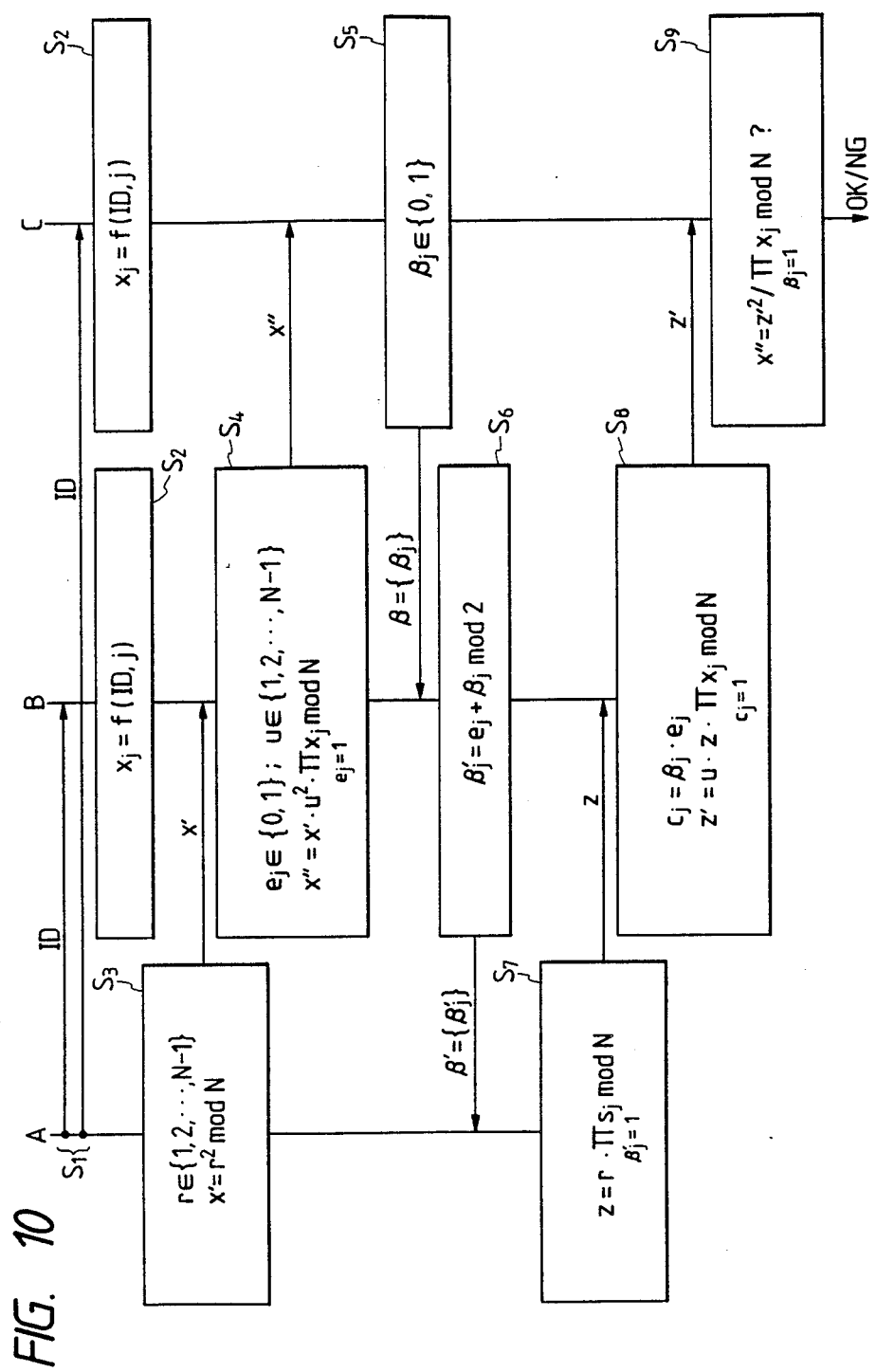
FIG. 10 is a diagram showing a concrete procedure of the user authentication system according to a second embodiment of the present invention.
Figure 11:
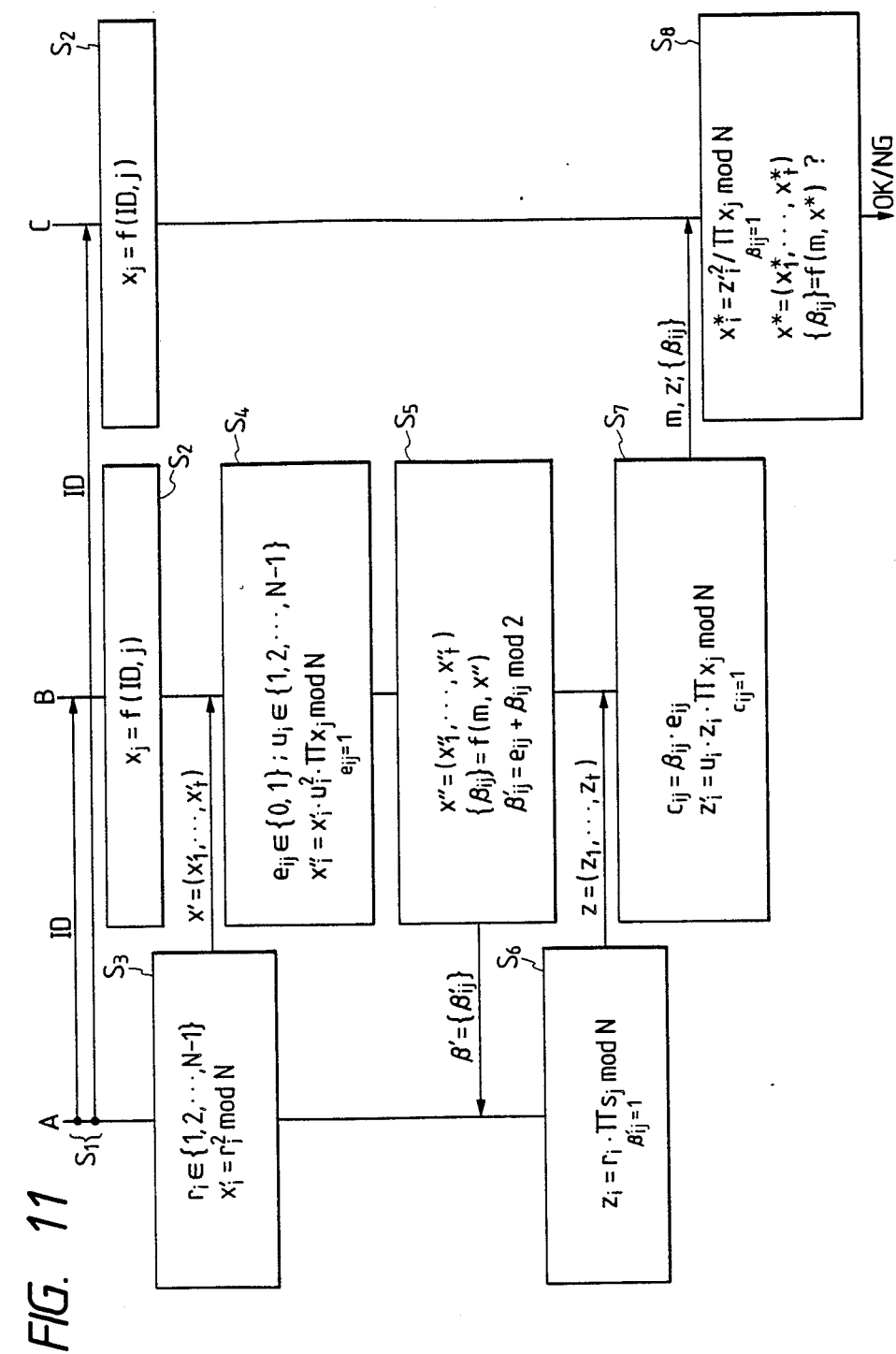
FIG. 11 is a diagram showing a concrete procedure of the message authentication system according to the second embodiment of the invention.

FIGS. 10 and 11 illustrate other embodiments of the procedures for the user authentication and the message authentication of the authentication system of the present invention which utilize the Fiat-Shamir method as in the cases of FIGS. 3 and 4. FIGS. 12 to 16 illustrate the constitutions of the prover A (100), the pretender signature or the client B (200) and the verifier C (300). They are identical in basic arrangement with but differ in operation from those shown in FIGS. 5 to 9. In addition, the prover A is so designed as to use k secret keys $s_j$ (j=1, 2, ..., k). In the case of k≧2, the security of the authentication system obtainable with one authentication procedure is particularly high. A description will be given first, with reference to FIGS. 12, 13 and 14, of the user authentication procedure of FIG. 10 by which the prover A proves to the verifier C that he has confirmed the identity of the pretender B.

As is the case of the Fiat-Shamir method, a trusted center makes public a composite number N and a one-way function f, computes k secret keys $s_j$ corresponding to identifying information ID of the prover A, and sends the secret keys $s_j$ to the prover A. It must be noted here that j=1, 2, ..., k and that $s_j$ satisfies $s_j^2 \pmod{N} = x_j = f(ID, j)$.

The prover A proves the validity of the pretender B to the verifier C following the following procedure.

Step $S_1$: The prover A sends identifying information ID to the pretender B and the verifier C.

Step $S_2$: The pretender B and the verifier C compute information $x_j=f(ID, j)$ by using the one-way function generators 205 and 305, respectively. In this instance, $j=1, 2, \ldots, k$. Next, the following steps $S_3$ to $S_6$ are repeated t times.

Step $S_3$: The prover A generates an initial response $x'$ by an initial response generator 110 and sends it to the pretender B.

The initial response generator 110 comprises, for example, a random generator 111 and a modulo calculator 112, and generates a random number r by the random generator 111 and computes $x'$ by the modulo calculator 112 by $$x'=r^2 \pmod{N}.$$

Step $S_4$: Upon receipt of the initial response $x'$, the pretender B applies k random bits $\{e_j\}$, each 0 or 1, and a random number u, both generated by a random generator 210, the initial response $x'$ and the aforementioned information $\{x_j\}$ to an initial response randomizer 215 to compute a randomized initial response $x''$, which is sent to the verifier C.

The initial response randomizer 215 is formed as a modulo calculator, for example, which computes the randomized initial response $x''$ from the received initial b response $x'$, the information $x_j$, the random bits $\{e_j\}$, and the random number u by $$x'' = x' \cdot u^2 \cdot \pi_{e_j=1} x_j \pmod{N}.$$

Step $S_5$: Upon receipt of the randomized initial response $X''$, the verifier C stores it in an information storage 310, then creates k random bits $\{\beta_j\}$, each 0 or 1, by a random generator 320, and sends $\beta=(\beta_1,\ldots,\beta_k)$ as an inquiry to the pretender B.

Step $S_6$: The pretender B inputs the inquiry $\beta$ and the afore-mentioned random bits $\{e_j\}$ into an inquiry randomizer 220 to compute a randomized inquiry $\beta'=(\beta'_1, \ldots, \beta'_k)$, which is sent to the prover A.

The inquiry randomizer 220 is formed as a modulo calculator, for example, which computes $$\beta'_j = \beta_j + e_j \bmod 2.$$

Step $S_7$: The prover A inputs the randomized inquiry $\beta'$ and the afore-mentioned random number r into a proving device 120 to compute a proved response z, which is sent to the pretender B.

The proving device 120 comprises, for example, a secret key storage 121 and a modulo calculator 122. k secret keys $\{s_j\}$, which are read out of the secret key storage 121, the random number r from the initial response generator 110, and the received randomized inquiry $\beta'$ are provided to the modulo calculator 122 to compute the proved response z by $$z = r \cdot \pi_{\beta'_j=1} s_j \pmod{N}.$$

Step $S_8$: The pretender B inputs the proved response z, the afore-mentioned information $\{x_j\}$, random bits $\{\beta_j\}$ and $e_j$ and random number u into a derandomizer 230, by which a proved response $z'$ free from the influence of random components is computed. The proved response $z'$ is sent to the verifier C.

The derandomizer 230 comprises, for example, a condition checker 231 and a modulo calculator 232, by which the proved response $z'$ is computed $$z' = u \cdot z \cdot \pi_{c_j=1} x_j \pmod{N}$$

where $C_j = \beta_j \cdot e_j$.

Step $S_9$: Upon receipt of the proved response $z'$, the verifier C verifies its validity by a verifying device 330.

The verifying device 330 comprises, for example, a modulo calculator 331 and a comparator 332, and checks whether or not $$x'' = z'^2 / \pi_{\beta_j=1} x_j \pmod{N}$$

holds for the initial response $x''$ from the information storage 310, the information $x_j$ from the one-way function calculator 305 and the inquiry $\beta$ from the random generator 320.

While in the above the inquiry-response interactions are performed sequentially t times, they also be conducted at the same time. Further, t may also be 1.

Figure 12:
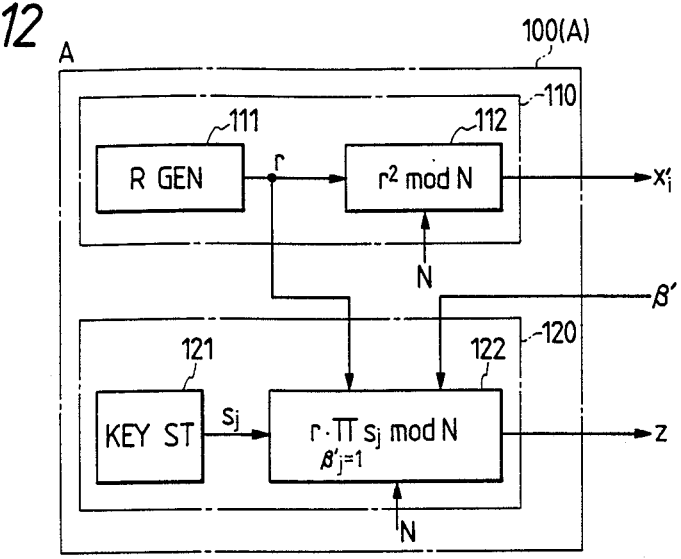
FIG. 12 is a block diagram illustrating the construction of the prover A for both the user authentication and the message authentication in the second embodiment of the invention.
Figure 13:
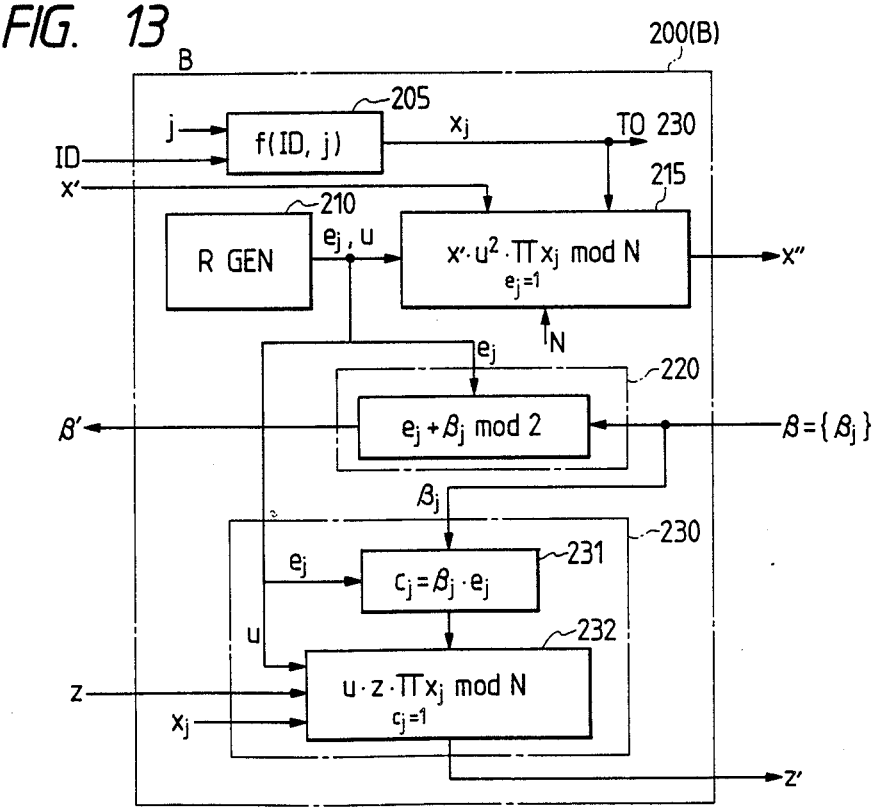
FIG. 13 is a block diagram illustrating the construction of the pretender B for the user authentication in the second embodiment of the invention.
Figure 14:
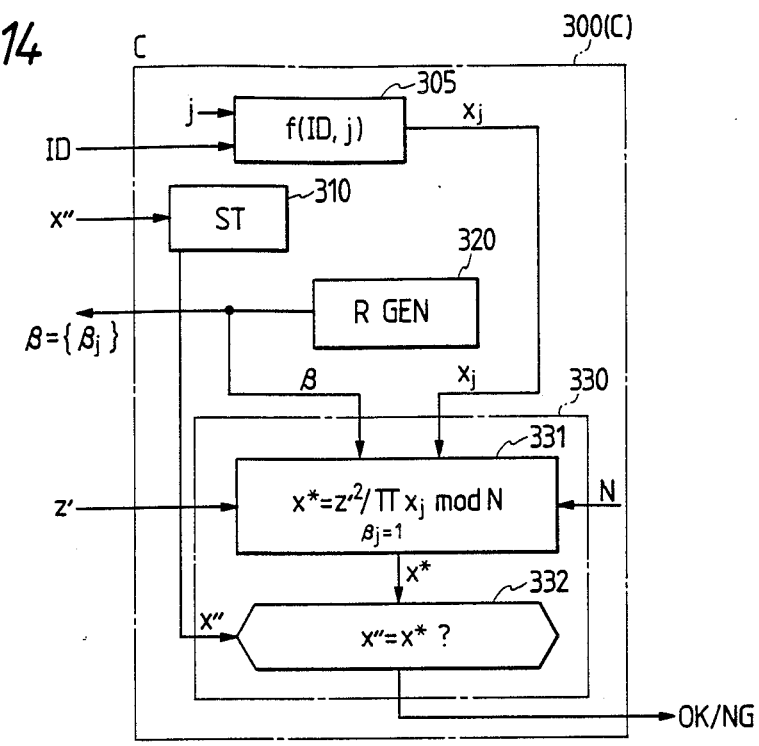
FIG. 14 is a block diagram illustrating the construction of the verifier C for the user authentication in the second embodiment of the invention.
Figure 16:
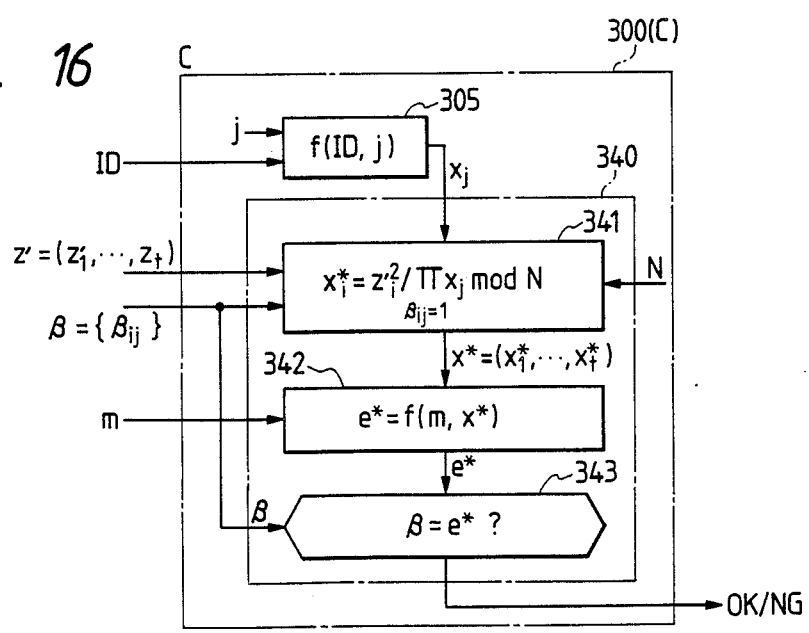
FIG. 16 is a block diagram illustrating the construction of the verifier C for the message authentication in the second embodiment of the invention.
Figure 15:
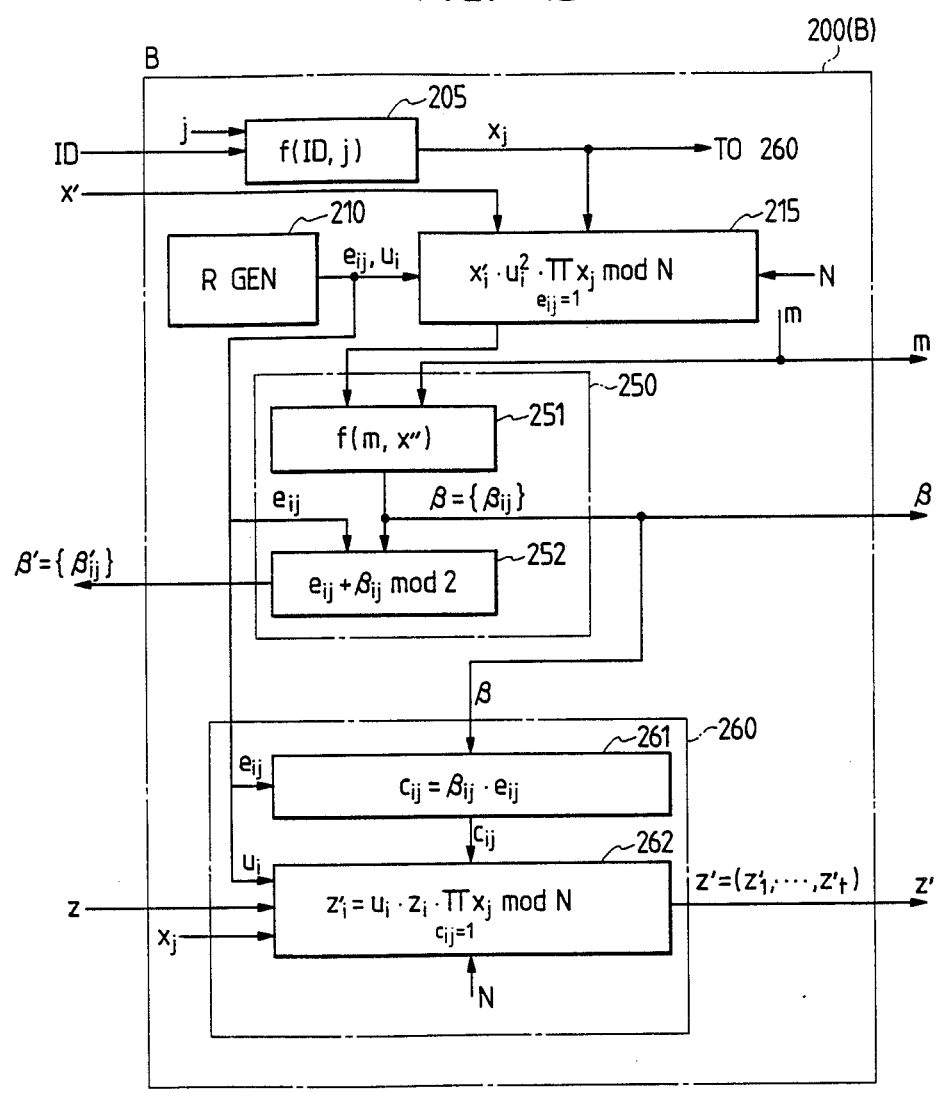
FIG. 15 is a block diagram illustrating the construction of the signature client B for the message authentication in the second embodiment of the invention.

Next, a description will be given, with reference to FIGS. 12, 15 and 16, of the message authentication procedure of FIG. 11 in which the signature client B signs a message m through the aid of the prover A.

As in the case of the Fiat-Shamir method, a trusted center makes public a composite number N and a one-way function f, computes k secret keys $\{s_j\}$ (where $j=1, 2, \ldots, k$) corresponding to the identifying information ID of the prover A, and delivers $\{s_j\}$ to the prover A. Here, $s_j$ satisfies $s_j^2 \pmod{N} = x_j = f(ID, j)$.

The signature client B signs the message m through the aid of the prover A as follows.

Step $S_1$: The prover A sends the identifying information ID to the signature client B and the verifier C.

Step $S_2$: The signature client B and the verifier C compute information $x_j = f(ID, j)$ by one-way function calculators 205 and 305, respectively.

Step $S_3$: The prover A computes, by an initial response generator 110, $x'$ composed of t initial response $x'_i$ $(i=1, 2, \ldots, t)$ and sends it to the signature client B.

The initial response generator 110 comprises, for example, a random generator 111 and a modulo calculator 112. The random generator 111 generates t random numbers $r_i$ and the modulo calculator 112 computes the t initial response $x'_i$ by $$x'_i = r_i^2 \pmod{N} \text{ for } i=1,2,\ldots,t.$$

Step $S_4$: Upon receipt of $x'$, the signature client B generates t sets of k bits $\{e_{ij}\}$ and random numbers $u_i$ by a random generator 210 and inputs their values, the received t initial responses $x'_i$ and the afore-mentioned $\{x_j\}$ into an initial response randomizer 215, from which t randomized initial responses $x''_i$ are obtained. The signature client B provides a randomized initial response $x''=(x''_1, \ldots, x''_t)$ to an inquiry generator 250.

The initial response randomizer 215 is formed by a modulo calculator for example. The t sets of $\{e_{ij}\}$ and $u_i$ created by the random generator 210, the received t initial responses $x'_i$, and $x_j$ calculated by the function calculator 205 and input into the initial response randomizer 215 to compute the t randomized initial responses $x''_i$ by $$x''_i = x'_i \cdot u_i^2 \cdot \pi_{e_{ij}=1} x_j \pmod{N}$$

for $i = 1, 2, \ldots, t$.

Step $S_5$: The signature client B inputs the message m and the t randomized initial responses $x''_i$ into an inquiry generator 250, by which an inquiry $\beta$ and a randomized inquiry $\beta'$ are produced. The randomized inquiry $\beta$ is transmitted to the prover A and the inquiry $\beta$ is provided to a derandomizer 260.

The inquiry generator 250 comprises, for example, a one-way function calculator 251 and a modulo calculator and computes $$\beta = \{\beta_{ij}\} \text{ and } \beta' = \{\beta'_{ij}\}$$

from $$\{\beta_{ij}\} = f(m, x''_1, \ldots, x''_t \text{ and } \beta'_{ij} = \beta_{ij} + e_{ij} \bmod 2$$
$$(i = 1, 2, \ldots, t \text{ and } j = 1, 2, \ldots, k)$$

Step $S_6$: Upon receipt of the randomized inquiry $\beta'$, the prover A computes, by a proving device 120, a proved response z from the afore-mentioned random number $r_i$ and the received randomized inquiry $\beta'$. The proved response z is sent to the signature client B.

The proving device 120 comprises, for example, a secret key storage 121 and a modulo calculator 122. The key secret keys $\{s_j\}$, which are read out of the secret key storage 121, $\{r_i\}$ from the initial response generator 110, and the received randomized inquiry $\beta'$ are input into the modulo calculator 122, from which $z = (z_1, \ldots, z_t)$ is obtained using $z_i$ computed by $$z_i = r_i \cdot \pi_{\beta'_{ij}=1} s_j \pmod{N} \text{ for } i = 1, 2, \ldots, t$$

Step $S_7$: The signature client B inputs the proved response z and the afore-mentioned $\{x_j\}$, $\{\beta_{ij}\}$ and t sets of $(\{e_{ij}\}, u_i)$ into a derandomizer 260, by which a proved response $z'$ free from the influence of random component is computed. The proved response $z'$ is sent to the verifier C, together with the inquiry $\beta$ and the message m.

The derandomizer 260 comprises, for example, a condition checker 261 and a modulo calculator 262, by which the proved response $z'$ is obtained $$z' = (z'_1, \ldots, z'_t)$$

using $z'_i$ computed by $$z'_i = u_i \cdot z_i \cdot \pi_{C_{ij}} x_j \pmod{N} \text{ for } i = 1, 2, \ldots, t$$

where $C_{ij} = \beta_{ij} \cdot e_{ij}$.

Step $S_8$: Upon receipt of the message m, the inquiry $\beta$ and the proved response $z'$, the verifier C checks their validity by a verifying device 240.

The verifying device 340 comprises, for example, a modulo calculator 341, a one-way function calculator 342 and a comparator 343, and computes $$x^* = (x^*_1, \ldots, x^*_t)$$

from $$x^*_i = z'^2_i / \pi_{\beta_{ij}=1} x_j \pmod{N},$$

thereby checking whether or not $$\{\beta_{ij}\} = f(m, x^*)$$

holds.

In the embodiment shown in FIGS. 10 and 11 the use of the k secret keys $s_j$ by the prover A provides increased security, and as a result of this, the number of interactions t among A, B and C can be decreased, but in the case where $t = 1$, since the power A uses the plural secret keys $s_j$, he calls for a large-capacity memory accordingly.

As an authentication system which requires smaller memory capacity for storing the secret key and is excellent in communication efficiency and high speed, an extended Fiat-Shamir scheme has been proposed by the present inventors (K. Ohta: "Efficient Identification and Signature Schemes," Electronics Letters, Vol. 24, No. 2, pp 115–116, 21st Jan., 1988 and K. Ohta, T. Okamoto: "Practical Extension of Fiat-Shamir Schemes," Electronics Letters, Vol. 24, No. 15, pp. 955–956, 21st Jan., 1988).

With the extended Fiat-Shamir schemes, the amount of processing is $(5 \text{ l}+2)/2$ multiplications (including modulo N calculations) on an average. The meaning of l will be described later. Since it is recommended to select $l = 20$, in particular, the number of multiplications needed in the extended Fiat-Shamir schemes is 51; namely, the amount of processing can be reduced about 7%, as compared with the amount of processing needed in the signature scheme employing the RSA scheme.

The outline of the extended Fiat-Shamir schemes is as follows.

A trusted center creates, by the following steps, a secret key s for a user who wears ID as his personal identifying information. Here, N is information made public and can be expressed as $N = P \times Q$, where P and Q are secret primes. L is an integer and f is a one-way function and is made public.

Step 1: $x = f(ID)$ is computed using the one-way function f.

Step 2: s which satisfies $s^L = x \pmod{N}$ is computed using the prime factors P and Q of N (that is, s is the L power root of x).

Step 3: The center secretly issues s to the user and makes public the one-way function f and the composite number N.

The user authentication system is as follows.

By the following steps the prover A proves to the verifier C that he is A.

Step 1: The prover A sends ID to the verifier C.

Step 2: The verifier C computes $x = f(ID)$.

The following steps 3 to 6 are repeated t times (t being a parameter which defines security and equal to or greater than 1).

Step 3: The prover A creates a random number r, computes $x'=r^L(\mod N)$ and sends it to the verifier C.

Step 4: The verifier C creates an integer e equal to or greater than 0 but smaller than L and sends it to the prover A.

Step 5: The prover A creates a signed message z by $z=r\cdot s^e(\mod N)$ and sends it to the verifier C.

Step 6: The verifier C checks whether or not $x'=z^L\cdot x^{-e}(\mod N)$ holds. ($x-1$ is an inverse element of x in mod N.)

According to the method of creating z, $z^L\cdot x^{-e}=r^L\cdot(s^L\cdot x^{-1})^e=r^L=x'(\mod N)$, so that when the check in Step 6 is successful, the verifier C accepts A's proof of identity. Here, the probability of the verifier C mistaking a false prover for the real prover A is $1/L^t$.

With the extended Fiat-Shamir scheme, even if only one secret key s is used and the steps 3 to 6 are repeated only once, the security can be provided by a suitable selection of the integer L.

The above is the user authentication system, and the message authentication system can be implemented by modifying the above procedure as follows.

The first 1 bits of f(m, x'), obtained by applying the message m and x' to the one-way function f, are regraded as a binary representation of the integer e, and (ID, m, e, z) is transmitted as a signed message to the verifier.

As described above, the extended Fiat-Shamir scheme is a high-speed authentication system which affords reduction of the memory capacity for storing the secret key and is excellent in communication efficiency. Nevertheless, there has been proposed no untraceable authentication system using the extended Fiat-Shamir scheme.

Figure 17:
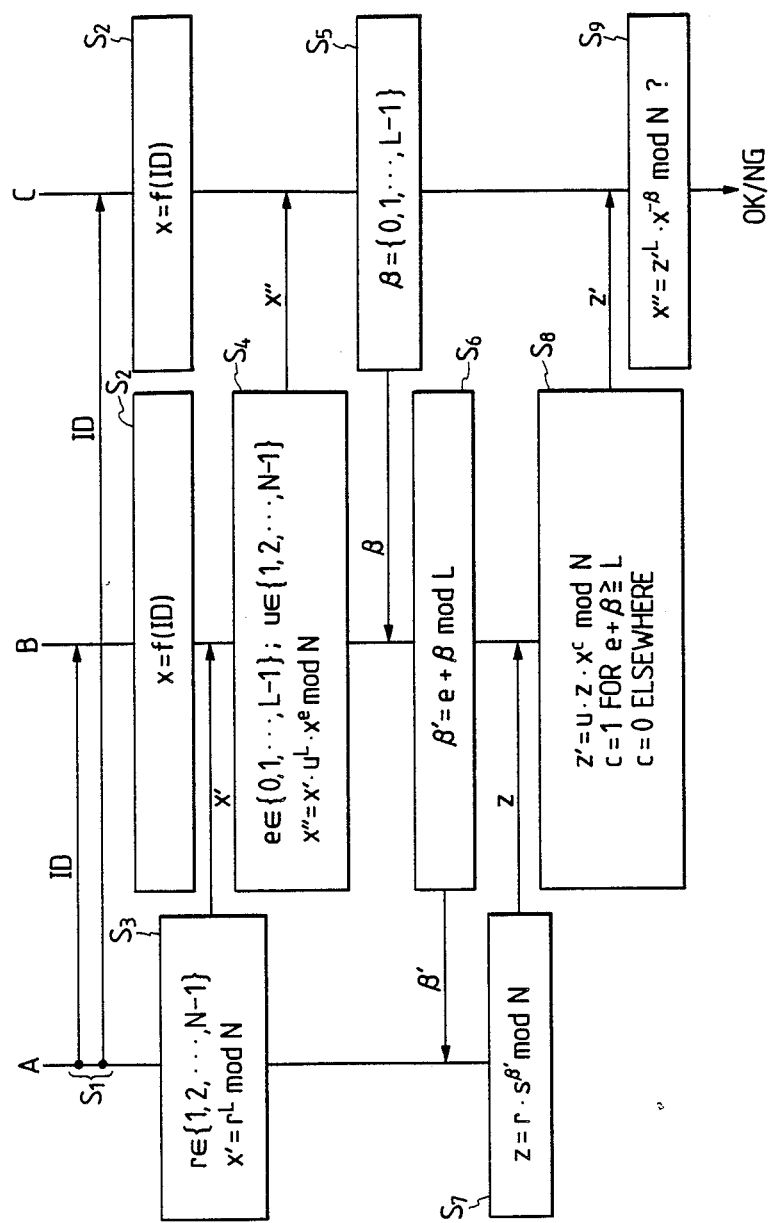
FIG. 17 is a diagram showing a concrete procedure of the user authentication system according to a third embodiment of the present invention.
Figure 18:
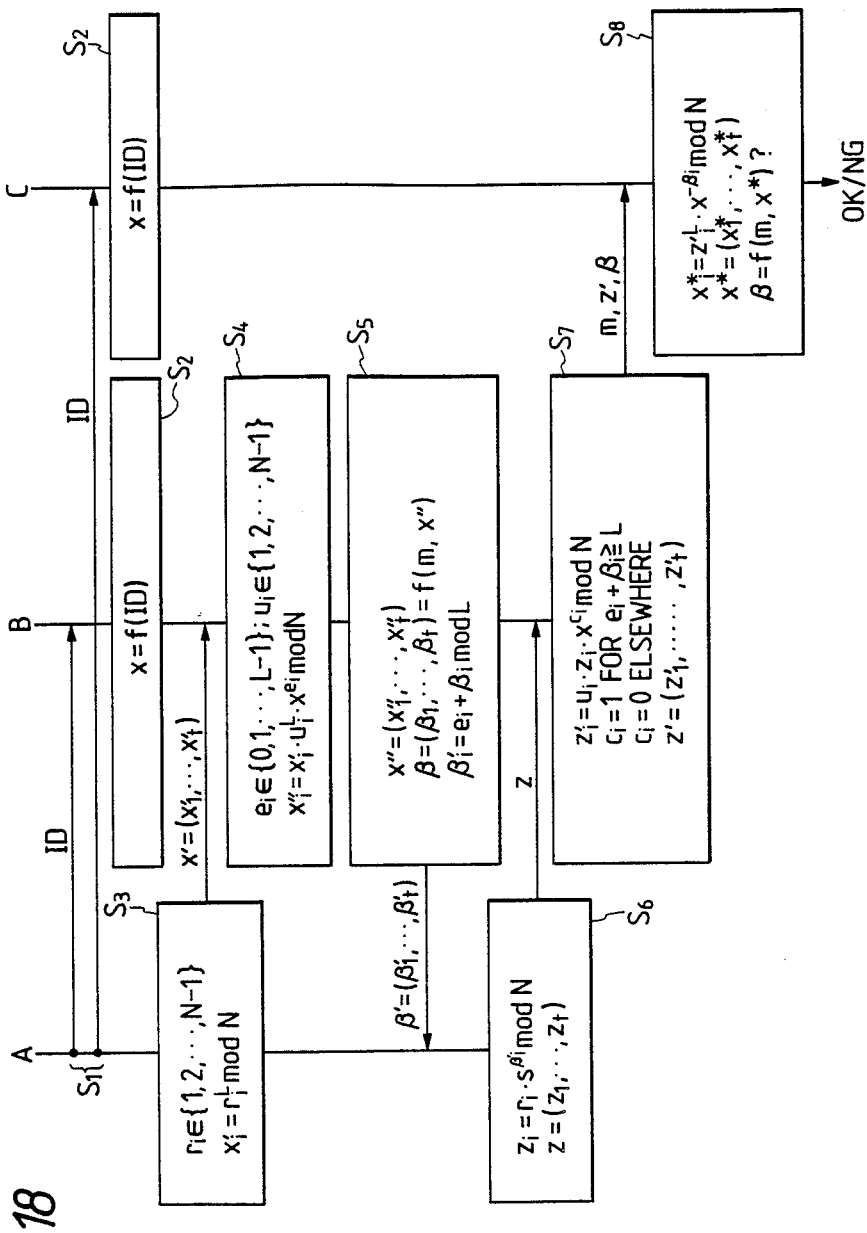
FIG. 18 is a diagram showing a concrete procedure of the message authentication system according to the third embodiment of the invention.

FIGS. 17 and 18 are diagrams respectively illustrating the user authentication and the message authentication procedure in the case of applying the above-described extended Fiat-Shamir scheme to the authentication systems of the present invention shown in FIGS. 1 and 2. FIGS. 19 to 23 illustrate the arrangements of the prover A (100), the pretender or signature client B (200) and the verifier C (300) for executing these authentications. The basic arrangements of the prover A, the pretender or signature client B, and the verifier C are identical with those depicted in FIGS. 5 to 9 and 12 to 16. A description will be given first, with reference to FIGS. 19, 20 and 21, of the user authentication procedure of FIG. 17 by which the prover A proves to the verifier C that he has established the identity of the pretender B.

As in the case of the extended Fiat-Shamir scheme, a trusted center makes public the composite number N, the one-way function f, and the integer L, computes a secret key s corresponding to identifying information ID of the prover A, and delivers the secret key s to the prover A. Here, s satisfies $s^L(\mod N)=x=f(ID)$.

The prover A proves the validity of the pretender B to the verifier C by the following procedure.

Step $S_1$: The prover A sends ID to the pretender B and the verifier C.

Step $S_2$: The pretender B and the verifier C compute information $x=f(ID)$ by one-way function calculators 205 and 305, respectively.

Next, the following steps $S_3$ to $S_6$ are repeated t times.

Step $S_3$: The prover A generates an initial response x' by an initial response generator 110 and sends it to the pretender B.

The initial response generator 110 comprises, for example, a random generator 111 and a modulo calculator 112. The random generator 111 generates a random number r, which is applied to the modulo calculator 112, wherein x' is computed by $$x'=r^L(\mod N).$$

Step S: 4 Upon receipt of the initial response x', the pretender b generates, by a random generator 210, a random integer e greater than 0 but smaller than L and a random number u equal to or greater than 1 but smaller than N, and inputs the random components e and u, the initial response x' and the afore-mentioned information x into an initial response randomizer 215 to obtain a randomized initial response x'', which is sent to the verifier C.

The initial response randomizer 215 is formed as, for example, a modulo calculator, which computes x'' from the received initial response x', the information x, the random integer e and the random number u by $$x''=x'\cdot u^L\cdot x^e(\mod N).$$

Step $S_5$: The verifier C stores the received randomized initial response x'' in an information storage 310, and creates, by a random generator 320, an integer $\beta$ greater than 0 but smaller than L, then sends the integer $\beta$ as an inquiry to the pretender B.

Step $S_6$: The pretender B inputs the and the afore-mentioned integer e into an inquiry randomizer 220 to compute a randomized inquiry $\beta'$, which is sent to the prover A. The inquiry randomizer 220 is formed as, for example, a modulo calculator, by which is computed $$\beta'=e+\beta(\mod L).$$

Step $S_7$: The prover A inputs the received randomized inquiry $\beta'$ and the afore-mentioned random number r into a proving device 120 to compute a proved response z, which is sent to the pretender B.

The proving device 120 comprises, for example, a secret key storage 121 and a modulo calculator 122. The secret key s read out of the secret key storage 121, the random number r from the initial response generator 110 and the received randomized inquiry $\beta'$ into the modulo calculator 122, wherein z is computed by $$z=r\cdot s^{\beta'}(\mod N).$$

Step $S_8$: The pretender B inputs the received proved response z, the aforementioned information x, the inquiry $\beta$ and the random components e and u into a derandomizer 230 to compute a proved response z' free from the influence of random components. The proved response z' is sent to the verifier C.

The derandomizer 230 comprises, for example, a condition checker 231 and a modulo calculator 232 and computes $$z'=u\cdot z\cdot x^c(\mod N)$$

where c=1 for $e+\beta\geq L$ c=0 elsewhere.

Step S9: Upon receipt of the proved response z', the verifier C checks its validity by use of a verifying device 330.

The verifying device 330 comprises, for example, a modulo calculator 331 and a comparator 332 and checks whether or not $$x'' = z'^L \cdot x^{-\beta} \pmod{N}$$

holds for the randomized initial response x'' supplied from the information storage 310, the function supplied from the one-way function calculator 305 and the integer β supplied from the random generator 320.

In the above the inquiry-response interactions (Steps S3 to S6) are sequentially repeated t times, but they may also be performed at the same time, with their t components arranged in parallel.

Figure 19:
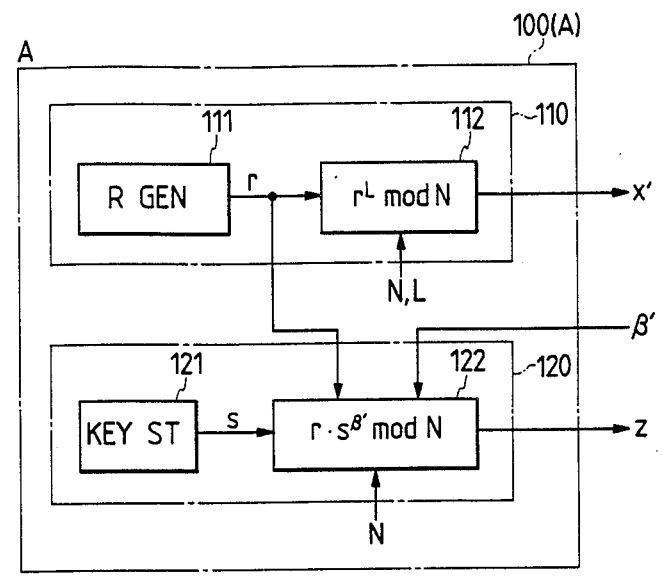
FIG. 19 is a block diagram illustrating the construction of the prover A for both the user authentication and the message authentication in the third embodiment of the invention.
Figure 20:
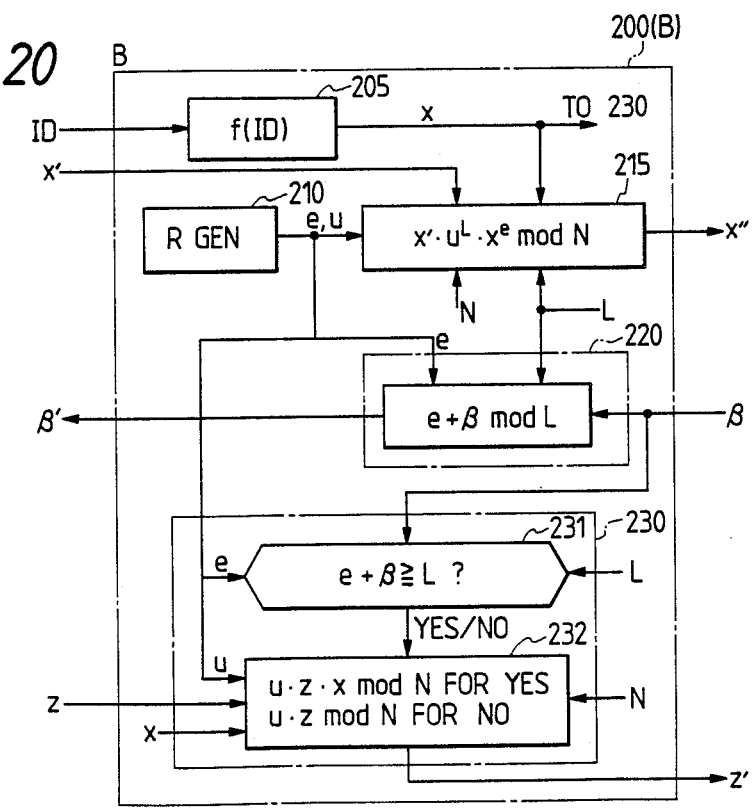
FIG. 20 is a block diagram illustrating the construction of the pretender B for the user authentication in the third embodiment of the invention.
Figure 21:
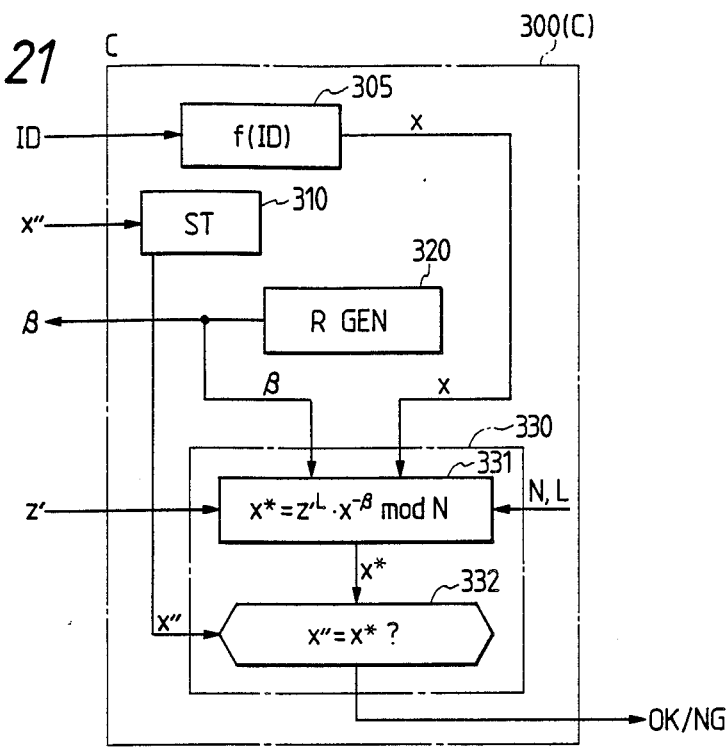
FIG. 21 is a block diagram illustrating the construction of the verifier C for the user authentication in the third embodiment of the invention.
Figure 23:
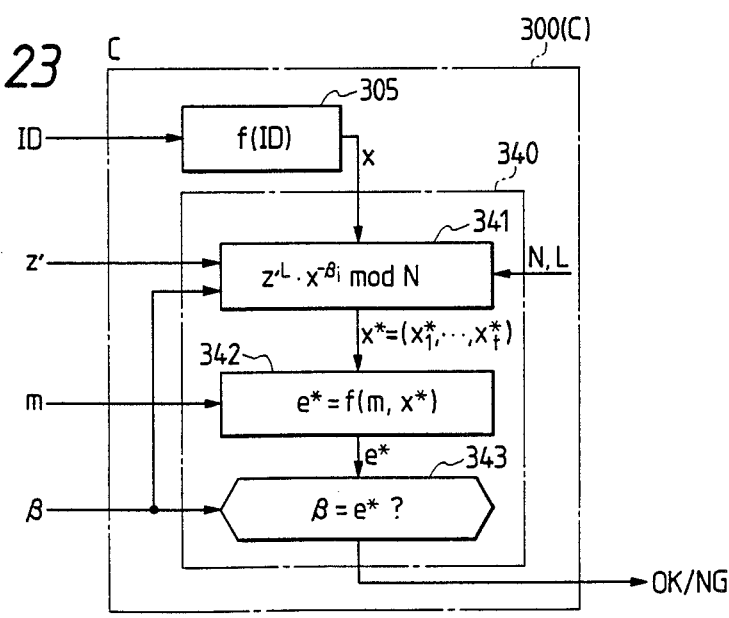
FIG. 23 is a block diagram illustrating the construction of the verifier C for the message authentication in the third embodiment of the invention.
Figure 22:
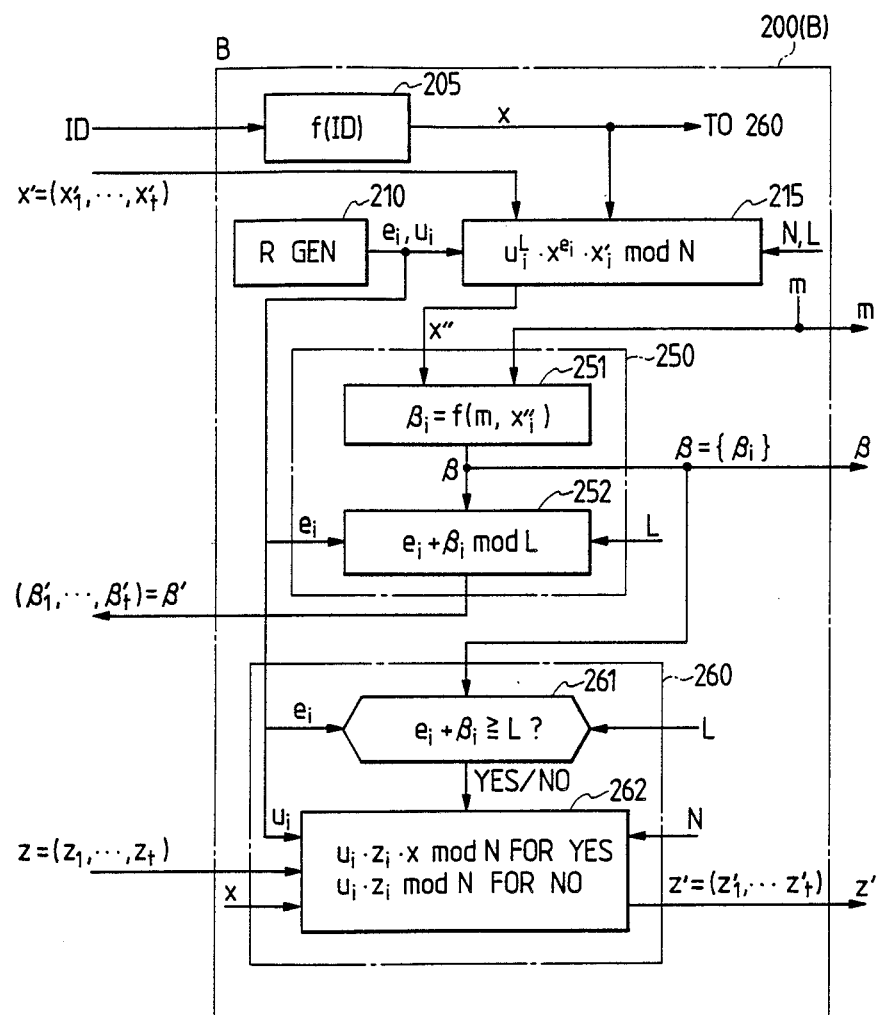
FIG. 22 is a block diagram illustrating the construction of the signature client B for the message authentication in the third embodiment of the invention.

Next, a description will be given, with reference to FIGS. 19, 22 and 23, of the message authentication procedure of FIG. 18 by which the signature client B signs a message m through the aid of the prover A.

This procedure utilizes the user authentication system of the extended Fiat-Shamir scheme between the prover A and the signature client B and the message authentication system of the extended Fiat-Shamir scheme between the signature client B and the verifier C. By keeping secret, on the part of the signature client B, information which links the two authentication systems with each other, it is possible to implement untraceable message authentication processing.

As in the case of the extended Fiat-Shamir scheme, a trusted center makes public a composite number N, a one-way function f and an integer L, computes a secret key s corresponding to identifying information ID of the prover A, and delivers it to the prover A. As in the above, s satisfies $s^L \pmod{N} = x = f(ID)$.

By the following procedure the signature client B signs a message m through the aid of the prover A.

Step S1: The prover A sends ID to the signature client B and the verifier C.

Step S2: The signature client B and the verifier C compute information $x = f(ID)$ by one-way function calculators 205 and 305, respectively.

Step S3: The prover A computes, by an initial response generator 110, an initial response x' composed of t initial responses $x'_i$ (i = 1, 2, ..., t) and sends it to the signature client B.

The initial response generator 110 comprises, for example, a random generator 111 and a modulo calculator 112. The random generator 111 generates t random number $r_i$, which are provided to the modulo calculator 112, wherein t initial responses $x'_i$ by $$x'_i = r_i^L \pmod{N} \text{ for } i = 1, 2, \ldots, t.$$

Step S4: Upon receipt of the initial response x', the signature client B generates, by a random generator 210 t sets of $e_i$ greater than 0 but smaller than L and a random numbers $u_i$ greater than 1 but smaller than N, and inputs their values, the received t initial responses $x'_i$ and the afore-mentioned information x into an initial response randomizer 215 to compute t randomized initial responses $x''_i$, which are provided to an inquiry generator 250.

The initial response randomizer 215 is formed by, for example, a modulo calculator. The t sets of $e_i$ and $u_i$ generated by the random generator 210, the received t initial responses $x'_i$ and the information x are applied to the initial response randomizer 215, wherein the t randomized initial responses $x''_i$ are computed by $$x''_i = u_i^L \cdot x^{e_i} \cdot x'_i \pmod{N} \text{ for } i = 1, 2, \ldots, t.$$

Step S5: The signature client B inputs the message m and the t randomized initial responses $x''_i$ into an inquiry generator 250, wherein an inquiry β and a randomized inquiry β' obtained by randomizing the former are created. The randomized inquiry β' is transmitted to the prover A and the inquiry β is supplied to a derandomizer 260.

The inquiry generator 250 comprises, for example, a one-way function calculator 251 and a modulo calculator 252 and obtains $\beta = (\beta_1, \ldots, \beta_t)$ and $\beta' = (\beta'_1, \ldots, \beta'_t)$ by $$(\beta_1, \ldots, \beta_t) = f(m, x''_1, \ldots, x''_t)$$

$$\beta'_i = e_i + \beta_i \pmod{L}$$
$$(i = 1, 2, \ldots, t).$$

Here, $\beta'_i$ and $\beta_i$ are integers greater than 0 but smaller than L.

Step S6: Upon receipt of the randomized inquiry β', the prover A computes, by a proving device 120, a proved response z from the afore-mentioned random number $r_i$ and the received inquiry β', and sends it to the signature client B.

The proving device 120 comprises, for example, a secret key storage 121 and a modulo calculator 122. The secret key s read out of the secret key storage 121, the random number $r_i$ generated by the random generator 111 and the received randomized inquiry $\beta' = (\beta'_1, \ldots, \beta'_t)$ are applied to the modulo calculator 122, wherein $z_i$ is computed by $$z_i = r_i \cdot s^{\beta'_i} \pmod{N} \text{ for } i = 1, 2, \ldots, t.$$

thereby obtaining $z = (z_1, \ldots, z_t)$.

Step S7: Upon receipt of the proved response z, the signature client B inputs the received proved response z, the afore-mentioned information x and t sets of ($e_i$, $u_i$), and the inquiry $\beta_i$ into a derandomizer 260, wherein a proved response z' free from the influence of random components is computed. The proved response z' is sent to the verifier C, along with the inquiry β and the message m.

The derandomizer 260 comprises, for example, a condition checker 261 and a modulo calculator 252. The proved response $z' = (z'_1, \ldots, z'_t)$ is obtained by $$z'_i = u_i z_i x^{c_i} \pmod{N}$$

where $c_i = 1$ for $e_i + \beta_i \geq L$ $c_i = 0$ elsewhere.

Step S8: Upon receipt of the message m, the inquiry β and the proved response z', the verifier C checks their validity by a verifying device 34.

The verifying device 340 comprises, for example, a modulo calculator 341, a one-way function calculator 342 and a comparator 343. $x^* = (x^*_1, \ldots, x^*_t)$ is obtained by $$x^*_i = z'_i{}^L \cdot x^{-\beta_i} \pmod{N}$$

thereby checking whether $\beta = f(m, x^*)$ holds.

The above is the untraceable authentication systems based on the extended Fiat-Shamir scheme. The Fiat-Shamir scheme and the extended Fiat-Shamir scheme are based on the fact that when the factorization of N into prime factors is difficult, the calculation of the square root in (mod N) and the calculation of the L power root in (mod N) are difficult. Accordingly, if an efficient method for factorization into prime factors should be discovered, the security of the blind signature systems based on these schemes could be endangered. On the other hand, an authentication scheme which utilizes difficulty of a discrete logarithm problem would be still secure, even if an efficient method for factorization into prime factors should be discovered, and this scheme is applicable to the authentication system of the present invention as is the case with the above-described Fiat-Shamir scheme and extended Fiat-Shamir scheme. The authentication scheme based on the discrete logarithm problem is discussed in M. Tompa and H. Woll, "Random Self-Reducibility and Zero Knowledge Interactive Proofs of Possession of Information," FOCS, pp. 472–482 (1987) and T. Okamoto and K. Ohta, "An abuse of Zero Knowledge Proofs, Measures to Protect It, and Its Applications," The proceedings of the 1988 Workshop Cryptography and Information Security, Kobe, Japan, July 28-29, 19888, for example.

Figure 24:
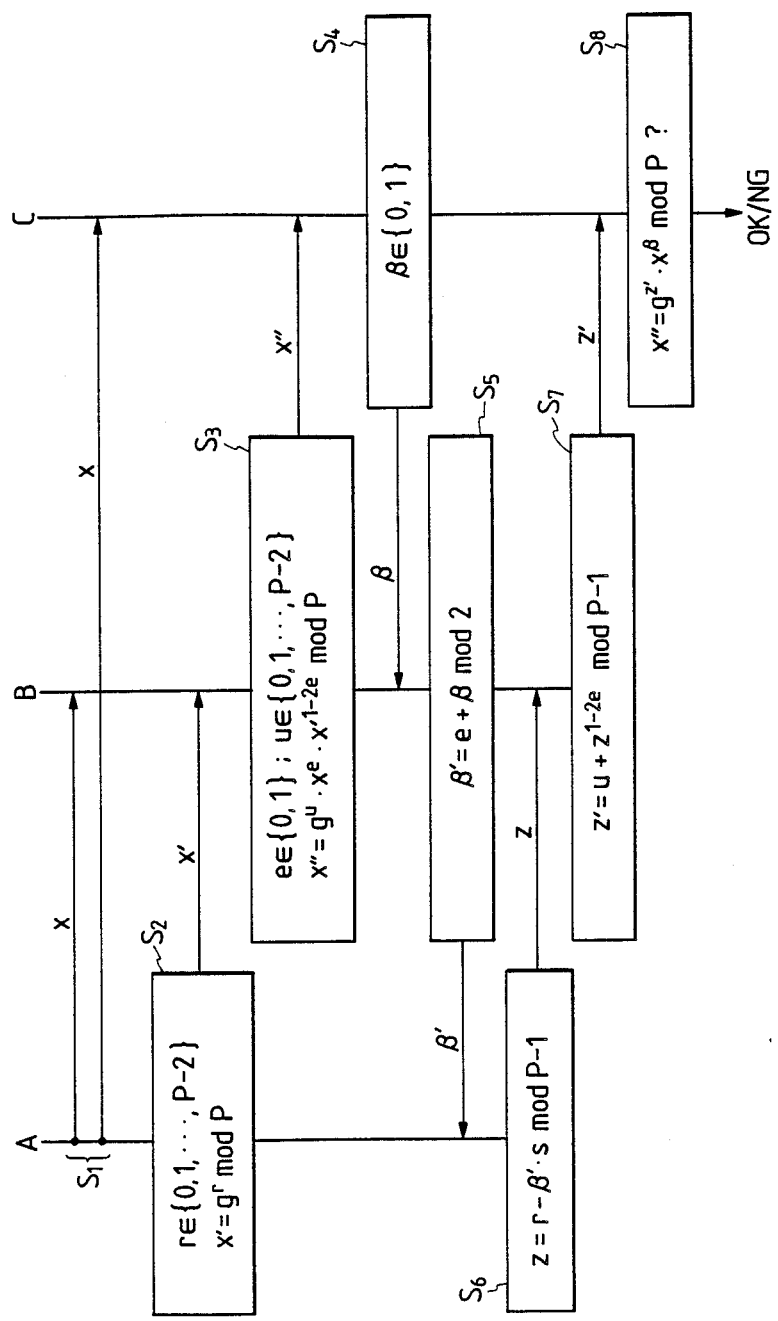
FIG. 24 is a diagram showing a concrete procedure of the user authentication system according to a fourth embodiment of the present invention.
Figure 25:
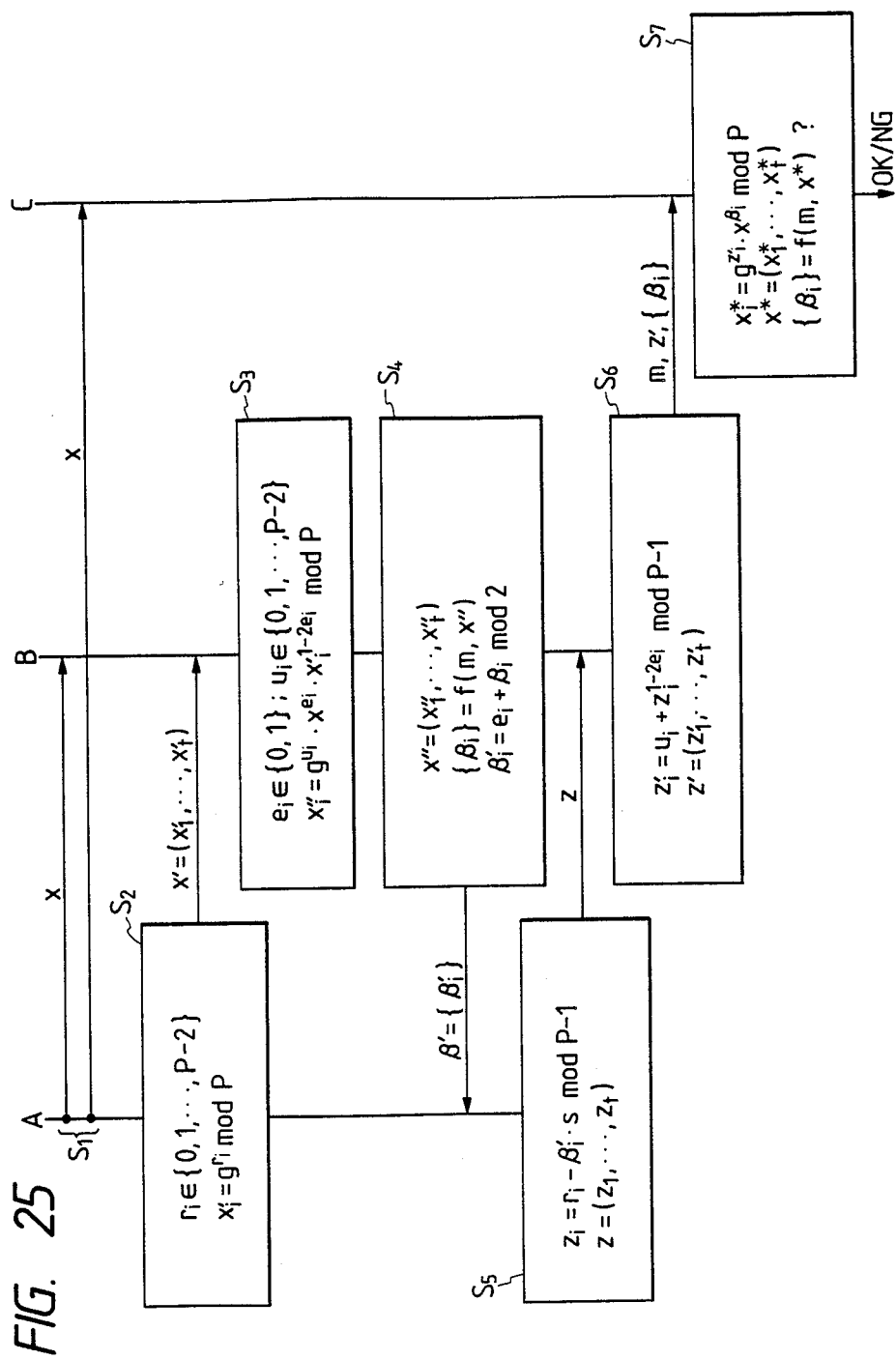
FIG. 25 is a diagram showing a concrete procedure of the message authentication system according to the fourth embodiment of the present invention.

FIGS. 24 and 25 are diagrams respectively illustrating the user authentication and the message authentication procedure in the case of applying the difficulty of the discrete logarithm problem to the authentication systems of the present invention shown in FIGS. 1 and 2. FIGS. 26 to 30 illustrate the constitutions of the prover A (100), the pretender or signature client B (200) and the verifier C (300) for the authentications. Their basic constitutions are identical with those in the embodiments described above. A description will be given first, with reference to FIGS. 26, 27 and 28, of the user authentication procedure of FIG. 24 by which the prover A proves to the verifier C that he has established the identity of the pretender B.

A trusted center makes public a prime P and an integer g. By the following procedure the prover A proves the validity of the pretender B to the verifier C. Let it be assumed here that the prover A holds, for public information x, a secret key s which satisfies $x = g^s \pmod{P}$.

Step $S_1$: The prover A sends the public information x to the pretender B and the verifier C.

Step $S_2$: The prover A creates an initial response x' by an initial response generator 110 and sends it to the pretender B.

The initial response generator 110 comprises, for example, a random generator 111 and a modulo calculator 112. A random number r ($0 \leq r \leq P-2$) generated by the random generator 111 and the public numbers g and P are provided to the modulo calculator 112, wherein the following computation is conducted:

$x' = g^r \pmod{P}$.

Step $S_3$: Upon receipt of the initial response x', the pretender B inputs a random bit e which is 0 or 1 and a random number u ($0 \leq u \leq P-2$), both generated by a random generator 210, the received initial response x', the public information x, and the public numbers g and P into an initial response randomizer 215, wherein a randomized initial response x'' is computed. The randomized initial response x'' thus obtained is sent to the verifier C.

The initial response randomizer 215 is formed as, for example, a modulo calculator, which computes the expression:

$x'' = g^u \cdot x^e \cdot x'^{1-2e} \pmod{P}$.

Step $S_4$: Upon receipt of the randomized initial response x'', the verifier C stores it in an information storage 310, generates a random number $\beta$ by a random generator 320, and transmits it as an inquiry to the pretender B.

Step $S_5$: Upon receipt of the inquiry $\beta$, the pretender B inputs it and the afore-mentioned random bit e into an inquiry randomizer 220, wherein a randomized inquiry $\beta'$ is computed. The randomized inquiry thus obtained is sent to the prover A.

The inquiry randomizer 220 is formed by, for example, a modulo calculator, which computes the following expression:

$\beta' = e + \beta \bmod 2$.

Step $S_6$: Upon receipt of the randomized inquiry $\beta'$, the prover A inputs the afore-mentioned random number r, the public number P, and the received randomized inquiry $\beta'$ into a proving device 120, wherein a proved response z is computed. The proved response z thus obtained is returned to the pretender B.

The proving device 120 comprises, for example a secret key storage 121 and a modulo calculator 122. A secret key s read out of the secret key storage 121, the random number r from the random generator 111, the public number P, and the randomized inquiry $\beta'$ are input into the modulo calculator 122, wherein the proved response z is computed by the following expression:

$z = r - \beta' s \pmod{P-1}$

Step $S_7$: Upon receipt of the proved response z, the pretender B inputs it, the public number P, the random bit e, and the random number u into a derandomizer 230, wherein a proved response z' free from the influence of random components is computed. The proved response z' thus obtained is sent to the verifier C.

The derandomizer 230 is formed by, for example, a modulo calculator, which computes the proved response z' by the following expression:

$z' = u + z^{1-2e} \pmod{P-1}$.

Step $S_8$: Upon receipt of the proved response z', the verifier C checks its validity by a verifying device 330.

The verifying device 330 comprises, for example, a modulo calculator 331 and a comparator 332. The modulo calculator 331 computes x* from the public numbers g and P, the public information x and the random number $\beta$ from the random generator 320 by the following expression:

$x^* = g^{z'} \cdot x \pmod{P-1}$.

The comparator 332 compares the x* and the initial response x″ read out of the information storage 310, thus checking whether or not x″=x* holds.

In this embodiment the random number r in the expression in Step $S_2$, for example, can be considered as a logarithm of x′ with g as its base, but in general, even if x′ is known, it is difficult to solve its logarithm. That is to say, this embodiment utilizes the difficulty in solving a discrete logarithm.

Figure 29:
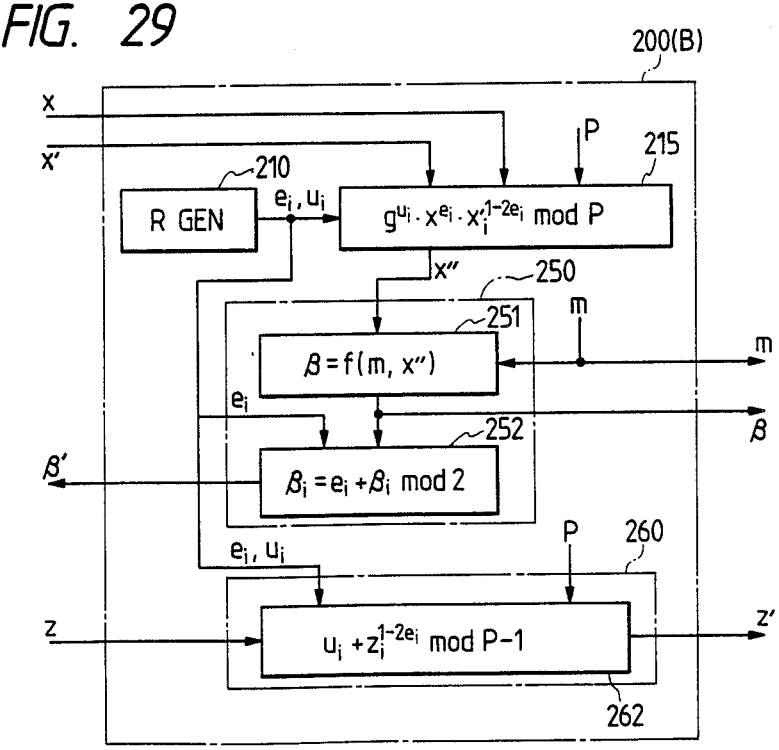
FIG. 29 is a block diagram illustrating the construction of the signature client B for the message authentication in the fourth embodiment of the invention.
Figure 30:
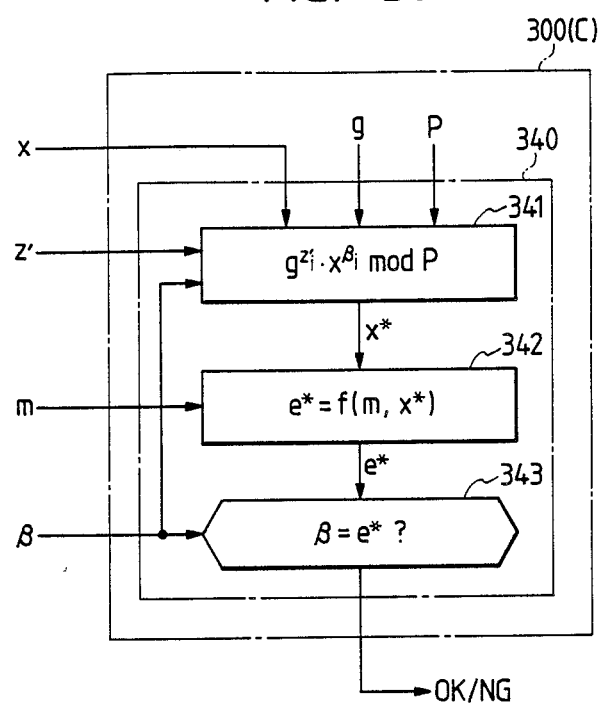
FIG. 30 is a block diagram illustrating the construction of the verifier C for the message authentication in the fourth embodiment of the invention.

Next, a description will be given, with reference to FIGS. 26, 29 and 30, of the message authentication procedure of FIG. 25 by which the signature client B signs a message m through the aid of the prover A.

A trusted center makes public an integer g and a prime P. The signature client B signs the message m by the aid of the prover A in the following manner.

Step $S_1$: The prover A sends public information x to the signature client B and the verifier C.

Step $S_2$: The prover A computes, by an initial response generator 110, an initial response x′ composed of $x_1$, $x_2$, ..., $x_t$, and sends it to the signature client B.

Figure 26:
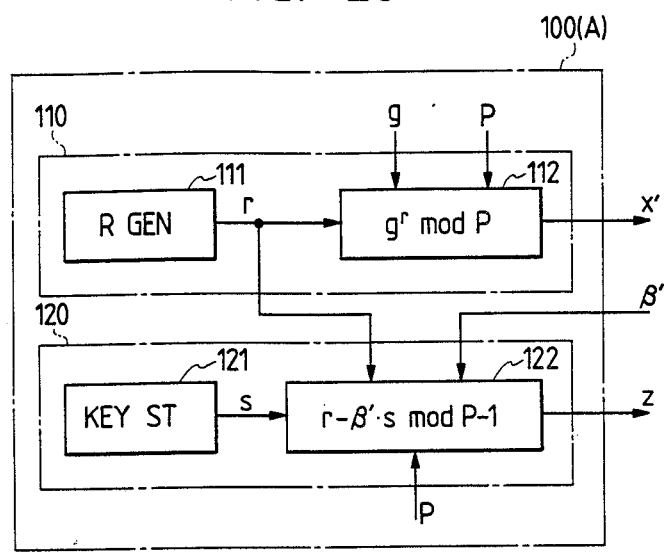
FIG. 26 is a block diagram illustrating the construction of the prover A for both the user authentication and the message authentication in the fourth embodiment of the invention.
Figure 27:
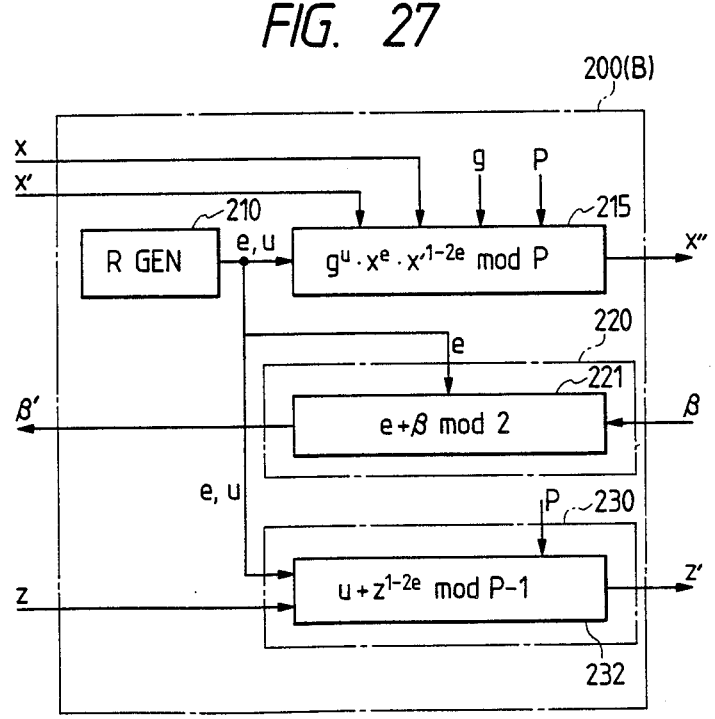
FIG. 27 is a block diagram illustrating the construction of the pretender B for the user authentication in the fourth embodiment of the invention.
Figure 28:
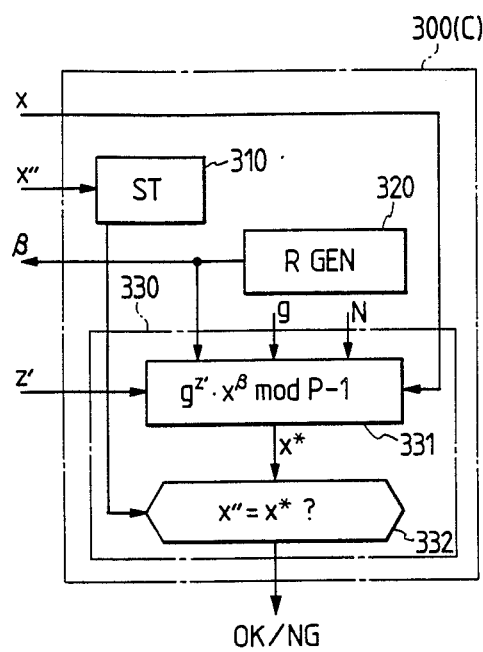
FIG. 28 is a block diagram illustrating the construction of the verifier C for the user authentication in the fourth embodiment of the invention.

The prover A is identical in construction with that of the prover A in the user authentication shown in FIG. 26, but the random generator 111 generates t random numbers $r_i$ (i=1, 2, ..., t; $0 \leq r_i < P-2$) and the random calculator 112 computes the t initial responses $x'_i$ (i=1, 2, ..., t) by the following expression:

$$x'_i = g^{r_i} \pmod{P}.$$

Step $S_3$: Upon receipt of the initial response x′, the signature client B generates t sets of random numbers $e_i$ and $u_i$ by a random generator 210. Each set of random numbers, the public number P, the public information x, and each of the received initial responses $x''_i$ are provided to an initial response randomizer 215, wherein t randomized initial responses $x''_i$ are computed. The t randomized initial responses $x''_i$ thus obtained are provided to an inquiry generator 250.

The initial response randomizer 250 is formed by a modulo calculator, which computes t randomized initial responses $x''_i$ from the t sets of random numbers $e_i$ and $u_i$, the received t initial responses $x'_i$, the public information x, and the public number P by the following expression:

$$x''_i = g^{u_i} \cdot x^{e_i} \cdot x'^{1-2e_i}_i \pmod{P}.$$

Step $S_4$: The signature client B further provides the message m, the t randomized initial responses $x''_i$ and the t random numbers $e_i$ to the inquiry generator 250 to create an inquiry β and a randomized inquiry β′ produced by randomizing the former. The randomized inquiry β′ thus obtained is sent to the prover A.

The inquiry generator 250 comprises a one-way function calculator 251 and a modulo calculator 252, and computes β and β′ by the following expressions:

$$\beta = (\beta_1, \ldots, \beta_t) = f(m, x''_1, \ldots, x''_t)$$

$$\beta'_i = e_i + \beta_i \bmod 2, \; \beta' = (\beta'_1, \ldots, \beta'_t)$$

Step $S_5$: Upon receipt of the randomized inquiry β′, the prover A computes, by a proving device 120, a proved response z from the afore-mentioned random number $r_i$ and the received randomized inquiry β′. The proved response z thus obtained is sent to the signature client B.

The proving device 120 comprises, for example, a secret key storage 121 and a modulo calculator 122. The secret key s read out of the secret key storage 121, the random number $r_i$ generated by the random generator 111 previously, the received randomized inquiry β′, and the public number P are provided to the modulo calculator 122, wherein the proved response z is computed by the following expression:

$$z_i = r_i - \beta'_i s \pmod{P-1}$$

$$z = (z_1, \ldots, z_t)$$

Step $S_6$: Upon receipt of the proved response z, the signature client B provides it and the t sets of random numbers ($e_i$, $u_i$) to a derandomizer 260, wherein a proved response z′ free from the influence of random components is computed. The proved response z′ thus obtained is sent to the verifier C, together with the initial inquiry β and the message m.

The derandomizer 260 is formed by, for example, a modulo calculator 262, which computes $z'_i$ by the following expression:

$$z'_i = u_i + z_i^{1-2e} \pmod{P-1}$$

$$z' = (z'_1, \ldots, z'_t)$$

Step $S_7$: Upon receipt of the message m, the initial inquiry β and the proved response z′, the verifier C checks their validity by a verifying device 340.

The verifying device 340 comprises, for example, modulo calculator 341, a one-way function calculator 342, and a comparator 343. The modulo calculator 341 computes x* from the received proved response z′, the initial inquiry β, the public information x, and the public numbers g and P by the following expression:

$$x^*_i = g^{z'_{hu\, i}} \cdot x^{\beta_i} \pmod{P}$$

$$x^* = (x^*_1, \ldots, x^*_t).$$

The one-way function calculator 342 computes e* from the received message m and the above calculated x* by the following expression:

$$e^* = f(m, x^*).$$

The comparator 343 checks whether or not e* thus computed agrees with the received initial inquiry β.

In all of the embodiments described above in conjunction with FIGS. 3 to 9, 10 to 16, and 17 to 23, the information x is computed by applying the personal identifying information ID of the prover A to the one-way function f. However, since the one-way function f is public and since the personal identifying information ID is also essentially public, the information x can also be regarded as being substantially public. Accordingly, it is also possible to employ a method in which the center or prover A makes public the information x and the pretender or signature client B and the verifier C directly use the public information x without computing it by use of the one-way function f in step $S_2$ in the embodiments of each authentication system.

For example, in the embodiment shown in FIGS. 5 to 9, the prover device 100 in FIG. 5 can be used for both of the user authentication and the message authentication by the present invention. The pretender device 200 in the case of the user authentication shown in FIG. 6 is also substantially common to the signature client device 200 for the message authentication shown in FIG. 8. The same is true of the verifier devices 300 depicted in FIGS. 7 and 9. Accordingly, in the practice of the authentication system of the present invention, even if the prover device 100, the pretender or signature client device 200 and the verifier device 300 are designed so that they can be used for both of the user authentication and the message authentication, the scale of the apparatus will not become so large. The above is true of the embodiments of FIGS. 12 to 16, 19 to 23 and 26 to 30.

As described above, according to the present invention, the prover A creates the proved response z by randomizing his secret key s with a random number, and this prevents the pretender or signature client B from stealing the secret key s from the prover A, providing increased security of the authentication system.

The pretender or signature client B provides the relationship between the inquiries $\beta$ and $\beta'$ and the relationship between the proved responses z and z' in forms of secret random numbers, respectively. By keeping these relationships secret, the relationships between the data transmitted between the prover A and the pretender or signature client B and the data transmitted between the pretender or signature client B and the verifier C can be concealed. That is, in the user authentication the prover A can prove to the verifier C that he establishes the identity of the pretender B with out disclosing the B's identity. In the message authentication the signature client B can have the prover A sign the message m without allowing its contents to become known. As a result of this, even if the prover A and the verifier C should conspire, they could not know the identity of the pretender or signature client B nor detect the transmission of the message m from the pretender or signature client B. Thus untraceable authentication processing can be implemented.

By satisfying the zero knowledge interactive proof system property and non-transferability which are the results of theoretical studies on the computational complexity theory, the system of the present invention ensures that even if the prover A and the verifier C conspire, they could not know who the pretender or signature client B is and who the originator of the message m is.

As for the zero knowledge interactive proof system property and non-transferability, see, Feige, U. and Fiat, A. and Shamir, A., "Zero Knowledge Proofs of Identity," Proceedings of the 19th Annual ACM Symposium on Theory of Computing, pp. 210–217, 1987, for instance.

It will be apparent that many modifications and variations may be effected without departing from the scope of the novel concepts of the present invention.

What is claimed is:

1. An authentication system in which a prover A, a pretender B and a verifier C participate as the parties concerned, said system comprising the steps of:

Step 1: said prover A creates an initial response x' by use of at least a random number r and sends it to said pretender B;

Step 2: said pretender B generates random components, creates a randomized initial response x" by randomizing said initial response x' received from said prover A with at least said random component, and sends it to said verifier C;

Step 3: said verifier C creates and sends an inquiry $\beta$ to said pretender B;

Step 4: said pretender B creates a randomized inquiry $\beta'$ by randomizing said inquiry $\beta$ received from said verifier C with at least said random component, and sends it to said prover A;

Step 5: said prover A computes a proved response z corresponding to said randomized inquiry $\beta'$ from at least a secret key s, said random number r and said randomized inquiry $\beta'$, and sends it to said pretender B;

Step 6: said pretender B computes a derandomized proved response z' by use of at least said proved response z and said random component, and sends it to said verifier C; and Step 7: said verifier C checks whether or not said derandomized proved response z' is a correct response to said randomized initial inquiry x" and said inquiry $\beta$;

wherein the relationship between information (x', $\beta'$, z) transmitted between said pretender B and said prover A and information (x", $\beta$, z') transmitted between verifier C and said pretender B is held secret by keeping said random component secret on the part of the pretender B.

2. An authentication system in which a prover A, a signature client B and a verifier C participate as the parties concerned, said system comprising the steps of:

Step 1: said prover A creates an initial response x' by use of at least a random number r and sends it to said signature client B;

Step 2: said signature client B generates random components and creates a randomized initial response x" by randomizing said initial response x' received from said prover A with at least said random component;

Step 3: said signature client B creates an inquiry $\beta$ through computation from said randomized initial response x" and a message m and computes a randomized inquiry $\beta'$ by randomizing said inquiry $\beta$ with said random component, and sends the latter to said prover A;

Step 4: said prover A creates a proved response z corresponding to said randomized inquiry $\beta$ $\beta'$ by use of at least a secret key s, said random number r and said randomized inquiry $\beta'$, and sends it to said signature client B;

Step 5: said signature client B computes a derandomized proved response z' by use of at least said proved response z and said random components, and sends said message m, said inquiry $\beta$ and said derandomized proved response z' to said verifier C; and Step 6: said verifier C checks whether or not said derandomized proved response z' and said inquiry $\beta$ constitute a correct signature for said message m;

wherein the relationship between information (x', $\beta'$, z) transmitted between said signature client B and said prover A and information (m, $\beta$, z') transmitted between said verifier C and said signature client B is held secret by keeping said random components secret on the part of said signature client B.

3. The authentication system of claim 1 wherein in said step 1 said prover A computes said initial response x' by a modulo calculation using said random number r and public information x;

wherein in said step 2 said pretender B computes said randomized initial response x" by a modulo calculation using said initial response x', said random components and said public information x;

wherein in said step 4 said pretender B computes said randomized inquiry $\beta'$ by a modulo calculation using said inquiry $\beta$ and said random components;

wherein in said step 5 said prover A computes said proved response z by a modulo calculation using said random number r, said randomized inquiry $\beta'$ and said secret key s, said secret key s satisfying $s^2 \bmod N = x$, N being a public number which is the product of at least two secret primes;

wherein in said step 6 said pretender B computes said derandomized proved response z' by a modulo calculation using at least said proved response z, said random components and said public information x; and wherein in said step 7 said verifier C makes said check by determining whether or not said randomized initial response x" received from said pretender B matches with a value obtained by a modulo calculation from said derandomized proved response z', said inquiry $\beta$ and said public information x.

4. The authentication system of claim 2, wherein in said step 1 said prover A computes said initial response x' by a modulo calculation using said random number r and public information x;

wherein in said step 2 said signature client B computes said randomized initial response x" by a modulo calculation using said random components, said initial response x' and said public information x;

wherein in said step 3 said signature client B computes said randomized inquiry $\beta'$ by a modulo calculation using said random components and said inquiry $\beta$;

wherein in said step 4 said prover A computes said proved response z by a modulo calculation using said random number r, said randomized inquiry $\beta'$ and said secret key s, said secret key s satisfying $s^2 \bmod N = x$, N being a public number which is the product of at least two secret primes;

wherein in said step 5 said signature client B computes said derandomized proved response z' by a modulo calculation using at least said proved response z, said random components and said public information x; and wherein in said step 6 said verifier C performs a modulo calculation for said derandomized proved response z', said inquiry $\beta$ and said public information x to obtain a value x* and makes said check by determining whether or not information $\beta^* = f(m, x^*)$, obtained from said value x* and said message m by an operation using a one-way function f, matches with said inquiry $\beta$ received from said signature client B.

5. The authentication system of claim 1, wherein in said step 1 said prover A computes said initial response x' from said random number r through a modulo calculation;

wherein in said step 2 said pretender B computes said randomized initial response x" from said initial response x', said random components and k pieces of public information $x_j$ through a modulo calculation, where $j = 1, 2, \ldots, k$, k being an integer equal to or greater than 2;

wherein in said step 4 said pretender B computes said randomized inquiry $\beta'$ from said random components and said inquiry $\beta$ through a modulo calculation;

wherein in said step 5 said prover A computes said proved response z from said random number r, said randomized inquiry $\beta'$ and k secret keys $s_j$ through a modulo calculation, each of said secret keys $s_j$ satisfying $s_j^2 \bmod N = x_j$, N being a public number which is the product of at least two secret primes;

wherein in said step 6 said pretender B computes said derandomized proved response z' from said proved response z, said random components, said inquiry $\beta$ and said k pieces of public information $x_j$ through a modulo calculation; and wherein in said step 7 said verifier C makes said check by determining whether or not a value obtained by a modulo calculation from said derandomized proved response z', said inquiry $\beta$ and said k pieces of public information $x_j$ matches with said randomized initial response x" received from said pretender B.

6. The authentication system of claim 2, wherein in said step 1 said prover A computes, by modulo calculation, t initial responses $x'_i$ from t random numbers $r_i$ where t is an integer greater than 1, and $i = 1, 2, \ldots, t$;

wherein in said step 2 said signature client B computes, by modulo calculation, t randomized initial responses $x''_i$ from said t initial responses $x'_i$, said random components and k pieces of public information $x_j$ where $i = 1, 2, \ldots, t$, k is an integer equal to or greater than 2 and $j = 1, 2, \ldots, k$;

wherein in said step 3 said signature client B computes t inquiries $\beta_{ij}$ from $\beta_{ij} = f(m, x'')$ using said t initial inquiries $x''_i$ and said message m and creates, by modulo calculation, t randomized inquiries $\beta'_{ij}$ from said t inquiries $\beta_{ij}$ and said random components, f being a one-way function;

wherein in said step 4 said prover A creates, by modulo calculation, t proved responses $z_i$ from said t random numbers $r_i$, said t randomized inquiries $\beta'_{ij}$ and k secret keys $s_j$, said secret keys $s_j$ satisfying $s_j^2 \bmod N = x_j$, N being a public number which is the product of at least two secret primes;

wherein in said step 5 said signature client B creates, by modulo calculation, t derandomized proved responses $z'_i$ from said t inquiries $\beta_{ij}$, said random components, said t proved responses $z_i$ and said k pieces of public information $x_j$; and wherein in said step 6 said verifier C performs modulo calculations for said t derandomized proved responses $z'_i$, said t inquiries $\beta_{ij}$ and said k pieces of public information $x_j$ to obtain t values $x^*_i$ and makes said check by determining whether or not information $f(m, x^*_i)$, obtained from said t values $x^*_i$ and said message m by an operation using said one-way function, each match with the corresponding one of said t inquiries $\beta_{ij}$.

7. The authentication system of claim 1, wherein in said step 1 said prover A computes said initial response x' by a modulo calculation of the Lth power of said random number r;

wherein in said step 2 said pretender B computes, by a modulo calculation, said randomized initial response x" from said initial response x', said random components and public information x;

wherein in said step 4 said pretender B computes, by a modulo calculation, said randomized inquiry $\beta'$ from said inquiry $\beta$ and said random components;

wherein in said step 5 said prover A computes, by a modulo calculation, said proved response z from said random number r, said randomized inquiry $\beta'$ and said secret key s, said secret key s satisfying $s^L \bmod N = x$, N being a public number that is the product of at least two secret primes;

wherein in said step 6 said pretender B computes, by a modulo calculation, said derandomized proved response z' from said proved response z, said random components, said inquiry $\beta$ and said public information x; and wherein in said step 7 said verifier C makes said check by determining whether or not a value, obtained by a modulo calculation from said derandomized proved response z', said inquiry $\beta$ and said public information x, matches with said randomized initial response x" received from said pretender B.

8. The authentication system of claim 2, wherein in said step 1 said prover A computes, by a modulo calculation, t initial responses $x'_i$ by modulo calculation of the Lth power of said random numbers $r_i$, where t is an integer greater than 1 and i=1, 2, ..., t;

wherein in said step 2 said signature client B computes, by a modulo calculation, t randomized initial responses $x''_i$ from said t initial responses $x'_i$, said random components and public information x;

wherein in said step 3 said signature client B computes, by $\beta_i = f(m, x''_i)$, t inquiries $\beta_i$ from said t randomized initial responses $x''_i$ and said message m and creates, by a modulo calculation, t randomized inquiries $\beta'_i$ from said inquiries $\beta_i$ and said random components, f being a one-way function;

wherein in said step 4 said prover A creates, by a modulo calculation, t proved responses $z_i$ from said t randomized inquiries $\beta'_i$ and said secret key s, said secret key s satisfying $s^L \bmod N = x$, N being a public number that is the product of at least two secret primes;

wherein in said step 5 said signature client B creates, by a modulo calculation, t derandomized proved responses $z'_i$ from said t proved responses $z_i$, said random components, said t inquiries $\beta_i$ and said public information x; and wherein in said step 6 said verifier C performs a modulo calculation for said t derandomized proved responses $z'_i$, said t inquiries $\beta_i$ and said public information x to obtain t values $x^*_i$ and makes said check by determining whether or not information $f(m, x^*)$, obtained by applying said message m and said t values $x^*_i$ to said one-way function f, each matches with the corresponding one of said t inquiries $\beta_i$.

9. The authentication system of claim 1, wherein in said step 1 said prover A computes, by a modulo calculation, said initial response x' from the rth power, r being said random number, of a public number g;

wherein in said step 2 said pretender B computes, by a modulo calculation, said randomized initial response x" from said initial response x', said random components, public information x and said public number g;

wherein in said step 4 said pretender B computes, by a modulo calculation, said randomized inquiry $\beta'$ from said inquiry $\beta$ and said random components;

wherein in said step 5 said prover A computes, by a modulo calculation, said proved response z from said random number r, said randomized inquiry $\beta'$ and said secret key s;

wherein in said step 6 said pretender B computes, by a modulo calculation, said derandomized proved response z' from said proved response z and said random components; and wherein in said step 7 said verifier C makes said check by determining whether a value, obtained by a modulo calculation from said public number g, said derandomized proved response z', said inquiry $\beta$ and said public information x, matches with said randomized initial response x" received from said pretender B.

10. The authentication system of claim 2, wherein in said step 1 said prover A generates t random number $r_i$ and computes, by a modulo calculation, t initial responses $x'_i$ from the $r_i$-th powers, $r_i$ being said random numbers, of a public number g where t is an integer greater than 1 and i=1, 2, ..., t.

wherein in said step 2 said signature client B computes, by a modulo calculation, t randomized initial responses $x''_i$ from said t initial responses $x'_i$, said random components, a public number g and public information x;

wherein in said step 3 said signature client B computes, by $\beta_i = f(m, x''_i)$, t inquiries $\beta_i$ from said t randomized initial responses $x''_i$ and said message m and creates, by a modulo calculation, t randomized inquiries $\beta'_i$ from said inquiries $\beta_i$ and said random components, f being a one-way function;

wherein in said step 4 said prover A creates, by a modulo calculation, t proved responses $z_i$ from said random number $r_i$, said randomized inquiries $\beta'_i$ and said secret key s;

wherein in said step 5 said signature client B creates, by a modulo calculation, t derandomized proved responses $z'_i$ from said t proved responses $z_i$, and said random components; and wherein in said step 6 said verifier C performs a modulo calculation for said public number g, said t derandomized proved responses $z'_i$, said t inquiries $\beta_i$ and said public information x to obtain t values $x^*_i$ and makes said check by determining whether or not each information $f(m, x^*_i)$, obtained by applying said message m and said t values $x^*$ to said one-way function f, matches with the corresponding one of said inquiries $\beta$.

11. The authentication system of claim 1, 3, 5, 7 or 9, wherein a sequence of said steps 1 to 7 is repeated a plurality of times each for newly crated said random number r, said initial response x', said random components and said inquiry $\beta$.

12. The authentication system of claim 1, 3, 5, 7 or 9, wherein each of said steps 1 to 7 is repeated a plurality of times each for newly created said random number r, said initial response x', said random components and said inquiry $\beta$.

13. The authentication system of claim 3, 5, or 7, wherein said modulo calculations in said steps 1, 2, 5, 6 and 7 are each a modulo N calculation for said public number N.

14. The authentication system of claim 9, wherein said modulo calculations in said steps 1, 2, and 7 are each a modulo P calculation for a public prime P and said modulo calculations in said steps 5 and 6 are each a modulo (P−1) calculation for (P−1) and wherein said secret key s satisfies $g^s \bmod P = x$.

15. The authentication system of claim 4, 6 or 8, wherein said modulo calculations in said steps 1, 2, 4, 5 and 6 are each a modulo N calculation for said public number N.

16. The authentication system of claim 10, wherein said modulo calculations in said steps 1, 2 and 6 are each a modulo calculation P for a public prime P and said modulo calculations in said steps 4 and 5 are each a modulo (P−1) calculation for (P−1), and wherein said secret key s satisfies $g^s$ mod P=x.

17. The authentication system of claim 3, 4, 7, or 8, wherein said public information x is obtained from operation of x=f(ID) by applying personal identifying information ID of said prover A to said one-way function f.

18. The authentication system of claim 5 or 6, wherein said k pieces of public information $x_j$ are obtained from operation of $x_j$=f(ID, j) by applying personal identifying information ID of said prover A to said one-way function f.

19. A signature client device for a message authentication system in which a prover A proves the validity of a message of a signature client B to a verifier C, said device comprising:
   random generator means for generating random components;
   initial response randomizer means wherein an initial response x' input from said prover A is randomized with said random components from said randomizer means to output a randomized initial response x";
   inquiry generator means which outputs an inquiry $\beta$ created by an operation from said randomized initial response x" from said initial response randomizer means and a message m, and outputs a randomized inquiry $\beta'$ obtained by randomizing said inquiry $\beta$ with said random components; and
   derandomizer means which receives a proved response z from said prover A and said random components from said random generator means, eliminates the influence of said random components from said proved response z, and out puts a derandomized proved response z';
   wherein said message m, said inquiry 8 and said derandomized proved response z' are sent to said verifier C for verification.

20. The signature client device of claim 17, wherein said initial response randomizer means includes modulo calculating means which performs a modulo N calculation using at least said initial response x', said random components and public information x, thereby creating said randomized initial response x", where N is a product of at least two secret primes.

21. The signature client unit of claim 20, including one-way function means which receives personal identifying information ID of said prover A, performs an operation of x=f(ID) by use of a one-way function f and outputs said public information x.

22. The signature client device of claim 19 or 20, wherein said inquiry generator means includes means which performs a modulo calculation of the sum of said inquiry $\beta$ and said random component and outputs the result of said calculation as said randomized inquiry $\beta'$.

23. The signature client device of claim 19, wherein said initial response randomizer means include modulo calculation means which performs a modulo P calculation for a public prime P on the basis of said initial response x', said random components and said public information x, thereby producing said randomized initial response x".

24. The signature client device of claim 19, 20 or 23, wherein said inquiry generator means includes one-way function generator means which receives said message m and said randomized initial response x", operates $\beta$=f(m, x") with a one-way function f and out-puts said inquiry $\beta$.

25. The signature client device of claim 19, 20, 21, or 23 wherein said inquiry generator means includes means for computing said randomized inquiry $\beta'$ by a calculation of modulo 2 of said inquiry $\beta$ and said random component.

26. The signature client device of claim 20 or 21, wherein said derandomizer means which performs a modulo N calculation for said public number N on the basis of a proved response z received from said prover A, said random components and said public information and outputs said derandomized proved response z'.

27. The signature client device of claim 23, wherein said derandomizer means includes means which performs a modulo (P−1) calculation for said public prime P on the basis of said proved response z received from said prover A and said random components and outputs said derandomized proved response z'.

28. The signature client device of claim 19, wherein said random generator means is a means for generating, as said random components, t sets of a random bit $e_i$ and an arbitray random number $u_i$ where t is an integer greater than 1 and i=1, 2, ..., t;
   wherein said initial response randomizer means is a means which receives said t sets of random components $e_i$ and $u_i$, said public information x and said initial response x' received from said prover A and creates t randomized initial responses $x''_i$ by performing the following modulo N calculation for public number N:

$$x''_i = u_i^2 \cdot x^{-e_i} \cdot x'_i \pmod{N}$$

said public number N being the product of two secret primes;
   wherein said inquiry generator means includes one-way function means which receives said message m and said randomized initial responses $x''_i$, calculates $\beta_i$=f(m, $x''_i$) with a one-way function f and outputs said inquiry $\beta_i$, and modulo calculation means which receives said inquiries $\beta_i$ and said random components $e_i$, calculates $\beta_i+e_i$ mod 2, and outputs said randomized inquiries $\beta'_i$; and
   wherein said derandomizer means is a means which receives said random components $e_i$ and $u_i$, said inquiries $\beta_i$, said public information x, said public number N and said proved responses $z_i$ received from said prover A and computes said derandomized proved responses $z'_i$ by $$z'_i = \begin{cases} u_i \cdot z_i \cdot x^{-1} \pmod{N} & \text{for } e_i = 1 \text{ at the same time } \beta_i = 0 \\ u_i \cdot z_i \pmod{N} & \text{otherwise} \end{cases}$$

29. The signature client device of claim 19, wherein said random generator means is a means for generating, as said random components, t sets of k random bits $e_{ij}$ and t arbitrary random numbers $u_i$, where j=1, 2, ..., k, k being an integer greater than 1;
   wherein said initial response randomizer means is a means which receives said k random components $e_{ij}$ and $u_i$, k pieces of public information $x_j$ and said initial responses $x'_i$ and produces said t randomized initial responses $x''_i$ by the following modulo N calculation for said public number N:

$$x''_i = x'_i u_i^2 e_{ij} = lx_j \pmod{N},$$

where $i = 1, 2, \ldots, t$, and $j = 1, 2, \ldots, k$,
said public number N being the product of two secret primes;

wherein said inquiry generator means includes one-way function means which receives said message m and said randomized initial responses $x''_i$, calculates $\beta_{ij} = f(m, x''_i)$ with a one-way function f and outputs said inquiries $\beta_{ij}$, and modulo calculation means which receives said inquiries $\beta_{ij}$ and said random components $e_{ij}$, calculates $$\beta'_{ij} = e_{ij} + \beta_{ij} \pmod{2}$$

and outputs said randomized inquiries $\beta'_{ij}$; and wherein said derandomizer means includes logical product means which receives said random components $e_{ij}$ and said inquiries $\beta_{ij}$ and calculates their logical products $c_{ij} = \beta_{ij} \cdot e_{ij}$, and a means which receives said random components $u_i$, said logical products $c_{ij}$, said public information $x_i$, said public number N and said proved responses $z_i$ received from said prover A and computing said derandomized proved responses $z'_i$ by $$z'_i = u_i \cdot z_i \cdot \prod_{c_{ij}=1} x_j \pmod{N},$$

where $i = 1, 2, \ldots, t$ and $j = 1, 2, \ldots k$.

30. The signature client device of claim 19, wherein said random generator means is a means for generating, as said t random components, random numbers $e_i \in \{0, 1, \ldots, L-1\}$ and random numbers $u_i \in \{1, 2, \ldots, N-1\}$, where $i = 1, 2, \ldots, t$, N being a public number that is the product of two primes and L an public integer;

wherein said initial response randomizer means is a means which receives said random components $r_i$ and $u_i$, public information x and said initial response $x'$ received from said prover A and produces said randomized responses $x''_i$ by the following modulo N calculation:

$$x''_i = x'_i u_i^L \cdot x^{e_i} \pmod{N}$$

wherein said inquiry generator means includes one-way function means which receives said message m and said randomized initial responses $x''_i$, computes $\{\beta_i\} = f(m, x''_i, \ldots, x''_t)$ with a one-way function f and outputs said inquiries $\beta_i$ and modulo calculation means which receives said inquiries $\beta_i$ and said random components $e_i$, calculates $$\beta'_i = e_i + \beta_i \pmod{L}$$

and outputs said randomized inquiries $\beta'_i$; and wherein said derandomizer means is a means which receives said random components $e_i$ and $u_i$, said inquiries $\beta_i$, said public information x, said public number N and said proved responses $z_i$ received from said prover A and computes said derandomized proved responses $z'_i$ by $$z'_i = \begin{cases} u_i z_i \cdot x \pmod{N} & \text{for } e_i + \beta_i \geq L \\ u_i z_i \pmod{N} & \text{elsewhere.} \end{cases}$$

31. The signature client device of claim 19, wherein said random generator means is a means which generates, as said random components, t sets of a random bit $e_i$ and an arbitray random number $u_i$, where t is an integer equal to or greater than 1, $i = 1, 2, \ldots, t$, and $0 \leq u_i \leq P-2$, P being a public prime;

wherein said initial response randomizer means is a means which receives said random components $e_i$ and $u_i$, public information x, a public number g and said initial responses $x'_i$ supplied from said prover A and generates said t randomized initial responses $x''_i$ by the following modulo P calculation:

$$x''_i = g^{u_i} \cdot x^{e_i} \cdot x_i^{1-2e_i} \pmod{P}$$

wherein said inquiry generator means includes a means which receives said message m and said randomized initial responses $x''_i$ and outputs said inquiry $\beta_i$ by calculating $\{\beta_i\} = f(m, x''_i, \ldots, x''_t)$ with a one-way function 5, and modulo calculation means which receives said inquiries $\beta_i$ and said random components $e_i$, performs a modulo 2 calculation of their sum and outputs the results of calculation as said randomized inquiries $\beta_i'$; and wherein said derandomizer means is a means which receives said random components $e_i$ and $u_i$, said proved responses $z_i$ and said public number P and computes said derandomized proved responses $z'_i$ by $$z'_i = u_i + z'_i{}^{1-2e_i} \pmod{P-1}.$$

* * * * *